(12) United States Patent
Kourogi et al.

(10) Patent No.: US 7,712,977 B2
(45) Date of Patent: May 11, 2010

(54) OPTICAL RESONATOR, OPTICAL MODULATOR, OPTICAL FREQUENCY COMB GENERATOR, OPTICAL OSCILLATOR AND METHOD OF PREPARING OPTICAL OSCILLATOR

(75) Inventors: Motonobu Kourogi, Kanagawa (JP); Kazuhiro Imai, Kanagawa (JP); Widiyatmoko Bambang, Tokyo (JP)

(73) Assignee: Optical Comb Institute, Inc., Tokyo (JP)

( * ) Notice: Subject to any disclaimer, the term of this patent is extended or adjusted under 35 U.S.C. 154(b) by 228 days.

(21) Appl. No.: 11/578,276

(22) PCT Filed: Apr. 14, 2005

(86) PCT No.: PCT/JP2005/007264

§ 371 (c)(1),
(2), (4) Date: Jun. 15, 2007

(87) PCT Pub. No.: WO2005/101102

PCT Pub. Date: Oct. 27, 2005

(65) Prior Publication Data

US 2007/0292069 A1 Dec. 20, 2007

(30) Foreign Application Priority Data

Apr. 14, 2004 (JP) ............ 2004-119457
Sep. 1, 2004 (JP) ............ 2004-254814

(51) Int. Cl.
*G02F 1/035* (2006.01)
(52) U.S. Cl. .................. 385/92; 359/346
(58) Field of Classification Search .......... 398/84; 359/328; 385/89, 130
See application file for complete search history.

(56) References Cited

U.S. PATENT DOCUMENTS 3,676,796 A * 7/1972 Weber .................. 372/19
(Continued)

FOREIGN PATENT DOCUMENTS

JP 7-27931 1/1995
(Continued)

OTHER PUBLICATIONS

Kazuhiro Imai et al., "Ko-Finesse Doharogata Hikari Shuhasu Comb Hasseiki", Dai 52 Kai Oyo Butsurigaku Kankei Rengo Koenkai Koen Yokoshu, No. 3 (Mar. 29, 2005), p. 1336, 3 Op-ZQ-18.

(Continued)

*Primary Examiner*—Frank G Font
*Assistant Examiner*—Peter Radkowski
(74) *Attorney, Agent, or Firm*—Haverstock & Owens LLp

(57) ABSTRACT

An optical resonator includes a waveguide (12) formed by using an incidence side reflection film (93) and an emission side reflection film (94) arranged in parallel with each other and adapted to resonate light entering it by way of the incidence side reflection film (93) and adapted to propagate light formed and resonated so as to run through from the incidence side reflection (93) to the emission side reflection film (94), a substrate (11) for forming the optical waveguide (12) on the top surface thereof and a first protection member (86) and a second protection member (87) corresponding to the material of the substrate (11) provided at an upper part of the waveguide (12) so as to make at least an end facet of each of the members form a plane (91) or (92) identical with the first end facet (84) or the second end facet (85), whichever appropriate, of the substrate (11) including the light incidence end or the light emission end, whichever appropriate, of the optical waveguide (11) and the incidence side reflection film (93) and the emission side reflection film (94) are laid respectively on the formed planes (91), (92).

18 Claims, 18 Drawing Sheets

U.S. PATENT DOCUMENTS

| | | | | |
|---|---|---|---|---|
| 4,861,136 A * | 8/1989 | Stone et al. | ............... | 385/27 |
| 4,893,353 A * | 1/1990 | Iwaoka et al. | ............... | 398/183 |
| 4,942,588 A * | 7/1990 | Yasui et al. | ............... | 372/103 |
| 5,274,650 A * | 12/1993 | Amano | ............... | 372/21 |
| 5,291,568 A * | 3/1994 | Uemiya et al. | ............... | 385/31 |
| 5,377,291 A * | 12/1994 | Hatakoshi et al. | ............... | 385/122 |
| 5,432,807 A * | 7/1995 | Okazaki et al. | ............... | 372/22 |
| 5,802,223 A * | 9/1998 | Nashimoto | ............... | 385/8 |
| 5,835,522 A * | 11/1998 | King et al. | ............... | 372/97 |
| 6,072,197 A * | 6/2000 | Horino et al. | ............... | 257/103 |
| 6,201,638 B1 * | 3/2001 | Hall et al. | ............... | 359/346 |
| 6,307,996 B1 * | 10/2001 | Nashimoto et al. | ............... | 385/130 |
| 6,429,669 B1 * | 8/2002 | Ito et al. | ............... | 324/753 |
| 6,473,218 B1 * | 10/2002 | Maleki et al. | ............... | 359/245 |
| 6,501,868 B1 * | 12/2002 | Kitaoka et al. | ............... | 385/14 |
| 6,513,226 B2 * | 2/2003 | Iwai et al. | ............... | 29/600 |
| 6,671,297 B2 * | 12/2003 | Takayama | ............... | 372/22 |
| 6,687,448 B2 * | 2/2004 | Iwai et al. | ............... | 385/132 |
| 6,795,481 B2 * | 9/2004 | Maleki et al. | ............... | 372/108 |
| 6,839,365 B1 * | 1/2005 | Sonoda et al. | ............... | 372/22 |
| 6,845,121 B2 * | 1/2005 | McDonald | ............... | 372/34 |
| 6,871,025 B2 * | 3/2005 | Maleki et al. | ............... | 398/183 |
| 6,965,128 B2 * | 11/2005 | Holm et al. | ............... | 257/103 |
| 7,020,374 B2 * | 3/2006 | Talin et al. | ............... | 385/131 |
| 7,110,652 B2 * | 9/2006 | Sasaura et al. | ............... | 385/132 |
| 7,127,145 B2 * | 10/2006 | Kamiyama et al. | ............... | 385/129 |
| 7,162,112 B2 * | 1/2007 | Lin et al. | ............... | 385/14 |
| 7,182,877 B2 * | 2/2007 | Murai et al. | ............... | 216/24 |
| 7,190,872 B2 * | 3/2007 | Kamiyama et al. | ............... | 385/129 |
| 7,239,442 B2 * | 7/2007 | Kourogi et al. | ............... | 359/346 |
| 7,260,279 B2 * | 8/2007 | Gunn et al. | ............... | 385/2 |
| 7,301,972 B2 * | 11/2007 | Loewen et al. | ............... | 372/18 |
| 7,315,697 B2 * | 1/2008 | Smilanski et al. | ............... | 398/201 |
| 7,551,342 B2 * | 6/2009 | Kourogi et al. | ............... | 359/279 |
| 2001/0055327 A1 * | 12/2001 | Kaneko et al. | ............... | 372/70 |
| 2002/0196509 A1 * | 12/2002 | Smilanski et al. | ............... | 359/188 |
| 2003/0072335 A1 * | 4/2003 | Momiuchi et al. | ............... | 372/21 |
| 2003/0072550 A1 * | 4/2003 | Sasaura et al. | ............... | 385/132 |
| 2003/0219046 A1 * | 11/2003 | Kitaoka et al. | ............... | 372/32 |
| 2004/0017833 A1 * | 1/2004 | Cundiff et al. | ............... | 372/18 |
| 2004/0182817 A1 * | 9/2004 | Murai et al. | ............... | 216/23 |
| 2004/0218880 A1 * | 11/2004 | Matsko et al. | ............... | 385/122 |
| 2004/0233950 A1 * | 11/2004 | Furukawa et al. | ............... | 372/43 |
| 2004/0240781 A1 * | 12/2004 | Savchenkov et al. | ............... | 385/27 |
| 2005/0018276 A1 * | 1/2005 | Kourogi et al. | ............... | 359/333 |
| 2005/0074200 A1 * | 4/2005 | Savchenkov et al. | ............... | 385/15 |
| 2005/0123306 A1 * | 6/2005 | Ilchenko et al. | ............... | 398/161 |
| 2005/0128566 A1 * | 6/2005 | Savchenkov et al. | ............... | 359/321 |
| 2005/0195879 A1 * | 9/2005 | Ishizu | ............... | 372/66 |
| 2005/0254534 A1 * | 11/2005 | Loewen et al. | ............... | 372/32 |
| 2007/0076282 A1 * | 4/2007 | Kourogi et al. | ............... | 359/237 |

FOREIGN PATENT DOCUMENTS

| | | |
|---|---|---|
| JP | 07-27931 | 1/1995 |
| JP | 7-277896 | 10/1995 |
| JP | 11-352350 | 12/1999 |
| JP | 2003-202609 | 7/2003 |
| JP | 2003-295140 | 10/2003 |
| JP | 2003-295140 A | 10/2003 |
| WO | 03/010596 A1 | 6/2003 |

OTHER PUBLICATIONS

Takanori Saitoh et al. "Modulation Characteristic of Waveguide-Type Optical Frequency Comb Generator", Journal of Lightwave Technology, vol. 16 No. 5, May 1998, pp. 824-832.

M. Kourogi et al., "A Monolithic Optical Frequency Comb Generator", IEE Photonics Technology Letters, IEE Photonics Technology Letters, IEE Service Center, Piscataway, NJ, US, vol. 6 No. 2, Feb. 1994, pp. 214-217.

* cited by examiner

OPTICAL RESONATOR, OPTICAL MODULATOR, OPTICAL FREQUENCY COMB GENERATOR, OPTICAL OSCILLATOR AND METHOD OF PREPARING OPTICAL OSCILLATOR

TECHNICAL FIELD

This invention relates to an optical resonator, an optical modulator, an optical frequency comb generator, an optical oscillator and a method of preparing an optical resonator that are applicable to technical fields where highly coherent multi-frequency reference light sources and light sources that can utilize the coherence among frequencies.

This application is based upon and claims the benefit of priority from the prior Japanese Patent Application Publications No. 2004-119457 filed on Apr. 14, 2004 and No. 2004-254814 filed on Sep. 1, 2004, the entire contents of which are incorporated herein by reference.

BACKGROUND ART

When highly accurately observing an optical frequency, the technique of heterodyne detection is employed. With heterodyne detection, light to be observed is made to interfere with other light to detect the electric signal of the generated optical beat frequency. The band of light which can be observed that can be used for heterodyne detection is limited by the frequency band of the light receiving element to be used for the detection system and is about tens of several GHz.

Meanwhile, as a result of the development of optoelectronics in recent years, the need for extending the band of light which can be observed has been intensified for the purpose of optical control for frequency multiplex communications and frequency observations of widely distributed absorption line.

Broad band heterodyne detection systems using an optical frequency comb generator have been proposed (see, for example, Patent Document 1: Jpn. Pat. Appln. Laid-Open Publication No. 2003-202609) to meet the need for extending the band of light which can be observed. Optical frequency comb generators are adapted to generate comb-shaped sidebands appearing at regular frequency intervals. The frequency stability of the sidebands is substantially equal to that of incident light. It is possible to set up a broad band heterodyne detection system of several THz where the generated sidebands and light to be observed are subjected to heterodyne detection.

FIG. 1 of the accompanying drawings schematically illustrates the principle of structure of a known optical frequency comb generator 3 of the bulk type.

Referring to FIG. 1, an optical resonator 100 including an optical phase modulator 31 and reflectors 32, 33 arranged opposite to each other with the optical phase modulator 31 interposed between them is used in the optical frequency comb generator 3.

The optical resonator 100 causes light $L_{in}$ that enters it by way of the reflector 32 with a small transmission factor to resonate between the reflectors 32, 33 and allows part of light $L_{out}$ by way of the reflector 33. The optical phase modulator 31 is formed by using electrooptic crystal for optical phase modulation of changing the refractive index by applying an electric field and adapted to modulate the phase of light passing through the optical resonator 100 according to the electric signal of frequency fm applied to the electrode 36.

With the optical frequency comb generator 3, it is possible to modulate the phase of light deeper by tens of several times than ever by using an electric signal that is synchronized with the time necessary for light to make a round trip in the optical resonator 100 and driving it to enter from the electrode 36 into the optical phase modulator 31 if compared with light that is made to pass through the optical phase modulator 31 only once. With this arrangement, it is possible to generate several hundreds of sidebands of higher orders. Then, all the frequency intervals fm of adjacent sidebands are equal to the frequency fm of the input electric signal.

Known optical frequency comb generators are not limited to the above described bulk type. For example, a waveguide type optical frequency comb generator 200 including a waveguide as shown in FIG. 2 of the accompanying drawings is also feasible.

Referring to FIG. 2, the waveguide type optical frequency comb generator 20 includes an waveguide type optical modulator 200. The waveguide type optical modulator 200 includes a substrate 201, a waveguide 202, an electrode 203, an incidence side reflection film 204, an emission side reflection film 205 and an oscillator 206.

The substrate 201 is typically formed by cutting a large crystal of $LiNbO_3$ or GaAs with a diameter of 3 to 4 inches grown by a pulling method into a wafer. The surface of the substrate 201 produced by cutting is then subjected to a mechanical polishing process and/or a chemical polishing process.

The waveguide 202 is provided to propagate light. The refractive index of the layer of the waveguide 202 is set to be higher than that of any other layer such as the substrate 201. Light that enters the waveguide 202 is propagated through the waveguide 202 as it is totally reflected by the interface thereof. Generally, the waveguide 202 can be prepared by diffusing Ti atoms in the substrate 201 or by depositing Ti atoms on the substrate 201 by epitaxial growth.

Note that an $LiNbO_3$ crystal type optical waveguide may be used as the waveguide 202. An $LiNbO_3$ crystal optical waveguide can be formed by diffusing Ti atoms on the surface of a substrate 201 mainly made of $LNbO_3$. When preparing an $LiNbO_3$ crystal type optical waveguide, firstly a photoresist pattern is formed on the surface of the substrate 201 and then Ti atoms are deposited. Subsequently, the photoresist is removed to produce Ti micro-wires having a width of microns. Thereafter, Ti atoms are thermally diffused in the substrate 201 by heating the Ti micro-wires.

As Ti is thermally diffused in the substrate 201 of $LiNbO_3$, light can be confined to the region where Ti is diffused as the region shows a refractive index higher than that of any other region. Thus, a waveguide 202 that can propagate light through the region where Ti is diffused is formed. Since an $LiNbO_3$ crystal type waveguide 202 prepared in a manner as described above has electrooptic effects, it is possible to change the refractive index by applying an electric field to it.

The electrode 203 is typically made of a metal material such as Al, Cu, Pt or Au and adapted to drive and input an electric signal of frequency fm into the waveguide 202. The direction of propagation of light agrees with the direction of progression of the modulation electric field. The speed of light propagating through the waveguide 202 may be made to agree with the speed of the electric signal propagating on the electrode 203 by adjusting a width and thickness of the electrode 203. With this arrangement, it is possible to maintain the phase of the electric signal relative to light propagating through the waveguide 202.

The incidence side reflection film 204 and the emission side reflection film 205 are provided to resonate light that enters the waveguide 202 by reciprocatingly reflecting light passing through the waveguide 202. The oscillator 206 is connected to the electrode 203 to supply an electric signal of frequency fm.

The incidence side reflection film 204 is arranged at the light receiving side of the waveguide type optical modulator 200 and receives light of frequency $v_1$ from the light source. The incidence side reflection film 204 reflects light that is reflected by the emission side reflection film 205 and passed through the waveguide 202.

The emission side reflection film 205 is arranged at the emission side of the waveguide type optical modulator 200 and reflects light that is passed through the waveguide 202. It also emits light that is passed through the waveguide 202 to the outside at a predetermined ratio.

Since the electric signal synchronized with the time necessary for light to make a round trip in the waveguide 202 is driven and input from the electrode 203 to the waveguide type optical modulator 200 of the waveguide type optical frequency comb generator 20 having the above-described configuration, it is possible to modulate the phase of light deeper by tens of several times than ever by using an electric signal that is synchronized with the time necessary for light to make a round trip in the optical phase resonator 111 and driving it to enter from the electrode 203 into the waveguide type optical modulator 200 if compared with light that is made to pass through the optical phase modulator 111 only once. With this arrangement, it is possible to generate broad sidebands like the above-described bulk type optical frequency comb generator 10. Then, all the frequency intervals fm of adjacent sidebands are equal to the frequency fm of the input electric signal.

The waveguide type optical frequency comb generator 20 is characterized by a small interacting region of light and an electric signal. Since light is confined in the waveguide 202 of dimensions in the order of microns having a refractive index higher than that of the surroundings and propagated, it is possible to locally raise the electric field intensity in the waveguide 202 by fitting the electrode 203 at a position close to the pole of the waveguide 202. Therefore, the electrooptic effects obtained in the waveguide 202 are greater than those of the waveguide of the bulk type optical frequency comb generator 3 so that the waveguide type optical modulator 200 can modulate light with less electric power.

DISCLOSURE OF THE INVENTION

Problems to be Solved by the Invention

However, known waveguide type optical frequency comb generator 20 as described above has a disadvantage that the operation of laying the incidence side reflection film 204 and the emission side reflection film 205 and polishing the end facets of the waveguide 202 where the films are laid is difficult due to the structure of the waveguide 202 and hence it is difficult to prepare resonators with a high degree of finesse and reproducibility. To improve the performance of a waveguide type optical frequency comb generator 20, it is indispensable to improve the finesse of the resonator including an incidence side reflection film 204 and an emission side reflection film 205. The number of reciprocations of light cannot be increased if the modulation index of the waveguide 202 is high only in the forward direction or the backward direction but the degree of finesse is low. Then, it is not possible to generate sidebands over a broad range with an enhanced intensity.

FIG. 3 of the accompanying drawings illustrates an end facet of a waveguide type optical frequency comb generator 20 where an incidence side reflection film 204 is formed. Referring to FIG. 3, a waveguide 202 is formed at the top of a substrate 201 and a thin buffer layer 210 is laid thereon. Finally, an electrode 203 is formed on the buffer layer 210. In short, the waveguide 202 is arranged at a corner of the top 211 of the end facet of the waveguide type optical frequency comb generator 20. Since the corner of the top 211 of the end facet is pointed, it can be more often than not chipped in a manner as shown in FIG. 3 during the polishing operation. When the top 211 of the end facet has chips 212, light to be resonated is scattered and lost.

If the corner of the top 211 of the end facet does not have chips 212, it may be rounded depending on the condition of polishing the end facet. When the corner is rounded, reflected light partly goes out of the waveguide mode of the waveguide 202 and becomes lost.

The corner of the top 211 of the end facet may remain free from chips 212 and roundedness by chance. However, a problem as described below arises when forming an incidence side reflection film 204 on the end facet even when the corner is free from chips and roundedness. A highly reflective film such as the incidence side reflection film 204 is normally prepared by depositing alternately component films showing a high refractive index and films showing a low refractive index. However, the films can easily be peeled off from the corner at the top of the end facet and the material of the component films showing a high refractive index can easily move from the end facet to the lateral surfaces to consequently change the film thickness. Then, it is no longer possible to control the film thickness according to the design value.

Thus problems of known waveguide type optical frequency comb generators 20 are summarized as follows.

Namely, since the end facet of the waveguide 202 is located at the corner of the top 211 of the end facet as pointed out above, the following are involved: 1) the corner of the end facet of the waveguide 202 can easily be chipped in the polishing process, 2) the corner of the end facet of the waveguide 202 can be rounded in the polishing process, 3) the reflection film formed on the end facet of the waveguide 202 can easily be peeled off at the corner of the top 211 of the end facet and 4) the reflection film formed on the end facet of the waveguide 202 moves from the corner of the top 211 of the end facet so that it is not possible to control the film thickness according to the design value.

These problems entail a reduced reflectivity of the reflection film laid on the end facet of the waveguide 202, a reduced finesse of the resonator including the incidence side reflection film 204 and the emission side reflection film 205 and a reduced performance level of the waveguide type optical frequency comb generator 20 itself.

Additionally, since the problems 1) through 4) depend on the environment of preparing the waveguide type optical frequency comb generator 20, it is difficult to secure the reproducibility of the waveguide type optical frequency comb generator 20 and a Fabry-Perot resonator realized by applying the former. In other words, it has not been possible to improve the yield of manufacture of such devices.

In view of the above-identified problems, it is therefore an object of the present invention to provide an optical resonator, an optical modulator, an optical frequency comb generator and an optical oscillator where the chips and the roundedness of the corner of the end facet of the waveguide are minimized in the polishing process and the reflection film is laid reliably and prevented from being peeled of at the corner of the top of the end facet to improve the reflectivity of the reflection film and the finesse of the resonator and improve the performance of the device as well as a method of preparing such an optical resonator.

According to the present invention, the above-identified problems are dissolved by providing an optical resonator including: a resonance means formed by using an incidence side reflection film and an emission side reflection film arranged in parallel with each other and adapted to resonate light entering it by way of the incidence side reflection film; an optical waveguide formed so as to run through from the incidence side reflection film to the emission side reflection film and adapted to propagate light resonated by the resonance means; a substrate for forming the optical waveguide on the top surface thereof; and an end facet protection means formed by respective members corresponding to the material of the substrate and provided at an upper part of the waveguide so as to make at least an end facet of each of the members form a plane identical with a first end facet or a second end facet, whichever appropriate, of the substrate including a light incidence end or a light emission end, whichever appropriate, of the optical waveguide, the incidence side reflection film and the emission side reflection film being laid respectively on the formed planes.

According to the present invention, the above-identified problems are dissolved by providing an optical modulator including: an oscillation means for oscillating a modulation signal of a predetermined frequency; a resonance means formed by using an incidence side reflection film and an emission side reflection film arranged in parallel with each other and adapted to resonate light entering it by way of the incidence side reflection film; an optical waveguide formed so as to run through from the incidence side reflection film to the emission side reflection film and adapted to modulate the phase of light resonated by the resonance means according to the modulation signal supplied from the oscillation means; a substrate for forming the optical waveguide on the top surface thereof; and an end facet protection means formed by respective members corresponding to the material of the substrate and provided at an upper part of the waveguide so as to make at least an end facet of each of the members form a plane identical with a first end facet or a second end facet, whichever appropriate, of the substrate including a light incidence end or a light emission end, whichever appropriate, of the optical waveguide, the incidence side reflection film and the emission side reflection film being laid respectively on the formed planes.

According to the present invention, the above-identified problems are dissolved by providing an optical modulator including: a detection means for detecting an electric signal; a resonance means formed by using an incidence side reflection film and an emission side reflection film arranged in parallel with each other and adapted to resonate light entering it by way of the incidence side reflection film; an optical waveguide formed so as to run through from the incidence side reflection film to the emission side reflection film and adapted to modulate the phase of light resonated by the resonance means according to the wavelength of the electric signal detected by the detection means; a substrate for forming the optical waveguide on the top surface thereof; and an end facet protection means formed by respective members corresponding to the material of the substrate and provided at an upper part of the waveguide so as to make at least an end facet of each of the members form a plane identical with a first end facet or a second end facet, whichever appropriate, of the substrate including a light incidence end or a light emission end, whichever appropriate, of the optical waveguide, the incidence side reflection film and the emission side reflection film being laid respectively on the formed planes.

According to the present invention, the above-identified problems are dissolved by providing an optical frequency comb generator including: an oscillation means for oscillating a modulation signal of a predetermined frequency; a resonance means formed by using an incidence side reflection film and an emission side reflection film arranged in parallel with each other and adapted to resonate light entering it by way of the incidence side reflection film; an optical waveguide formed so as to run through from the incidence side reflection film to the emission side reflection film and adapted to modulate the phase of light resonated by the resonance means according to the modulation signal supplied from the oscillation means and generate sidebands centered at the frequency of light and at intervals of the frequency of the modulation signal; a substrate for forming the optical waveguide on the top surface thereof; and an end facet protection means formed by respective members corresponding to the material of the substrate and provided at an upper part of the waveguide so as to make at least an end facet of each of the members form a plane identical with a first end facet or a second end facet, whichever appropriate, of the substrate including a light incidence end or a light emission end, whichever appropriate, of the optical waveguide, the incidence side reflection film and the emission side reflection film being laid respectively on the formed planes.

According to the present invention, the above-identified problems are dissolved by providing an optical oscillator including: a resonance means formed by using an incidence side reflection film and an emission side reflection film arranged in parallel with each other and adapted to resonate light entering it by way of the incidence side reflection film or light generated by laser amplification; an optical waveguide formed so as to run through from the incidence side reflection film to the emission side reflection film and adapted to amplify light resonated by the resonance means and emit it to the outside by way of the emission side reflection film; a substrate for forming the optical waveguide on the top surface thereof; and an end facet protection means formed by respective members corresponding to the material of the substrate and provided at an upper part of the waveguide so as to make at least an end facet of each of the members form a plane identical with a first end facet or a second end facet, whichever appropriate, of the substrate including a light incidence end or a light emission end, whichever appropriate, of the optical waveguide, the incidence side reflection film and the emission side reflection film being laid respectively on the formed planes.

According to the present invention, there is provided an optical oscillator including: an oscillation means for oscillating a modulation signal of a predetermined frequency; a resonance means formed by using an incidence side reflection film and an emission side reflection film arranged in parallel with each other and adapted to resonate light entering it by way of the incidence side reflection film or light generated by laser amplification; an optical waveguide formed so as to run through from the incidence side reflection film to the emission side reflection film and adapted to amplify light resonated by the resonance means according to the modulation signal from the oscillation means and emit it to the outside by way of the emission side reflection film; a substrate for forming the optical waveguide on the top surface thereof; and an end facet protection means formed by respective members corresponding to the material of the substrate and provided at an upper part of the waveguide so as to make at least an end facet of each of the members form a plane identical with a first end facet or a second end facet, whichever appropriate, of the substrate including a light incidence end or a light emission end, whichever appropriate, of the optical waveguide, the incidence side reflection film and the emission side reflection film being laid respectively on the formed planes, and the optical oscillator being adapted to lock the phases of a multiple of modes of laser oscillation.

The optical waveguide of an optical oscillator according to the invention locks the phases of a multiple of modes of laser oscillation on the basis of its own electrooptic effects and the oscillation means of the optical oscillator oscillates an optical pulse of a frequency equal to integer times of the FSR (free spectral range) of the resonance means.

According to the present invention, the above-identified problems are dissolved by providing a method of preparing an optical resonator for resonating light by means of an optical waveguide formed so as to run through from an incidence side reflection film to an emission side reflection film arranged in parallel with each other, the light entering by way of the incidence side reflection film, the method including: an optical waveguide forming step of forming the optical waveguide from the top surface of a substrate; a layering step of laying a buffer layer on the substrate so as to cover the optical waveguide formed in the optical waveguide forming step; an electrode forming step of forming an electrode for applying an electric filed to the optical waveguide on the buffer layer laid in the layering step; a providing step of providing members corresponding to the material of the substrate in an upper part of the waveguide so as to make at least an end facet thereof form planes identical with the respective end facets of the substrate including respectively the light incidence end and the light emission end of the optical waveguide; and a reflection film laying step of laying an incidence side reflection film or an emission side reflection film on the planes formed in the providing step.

Thus, in an optical modulator according to the present invention, the chips and the roundedness of the corner of the end facet of the waveguide are minimized in the polishing process and the reflection film is laid reliably and prevented from being peeled of at the corner of the top of the end facet to improve the reflectivity of the reflection film and the finesse of the resonator and improve the performance of the device.

Other objects of the invention and the specific advantages that the present invention provides will become apparent from the description given below by referring to the accompanying drawings that illustrate preferred embodiments of the invention.

BEST MODE FOR CARRYING OUT THE INVENTION

Now, the best mode for carrying out the present invention will be described below in detail by referring to the accompanying drawings.

Figure 1:
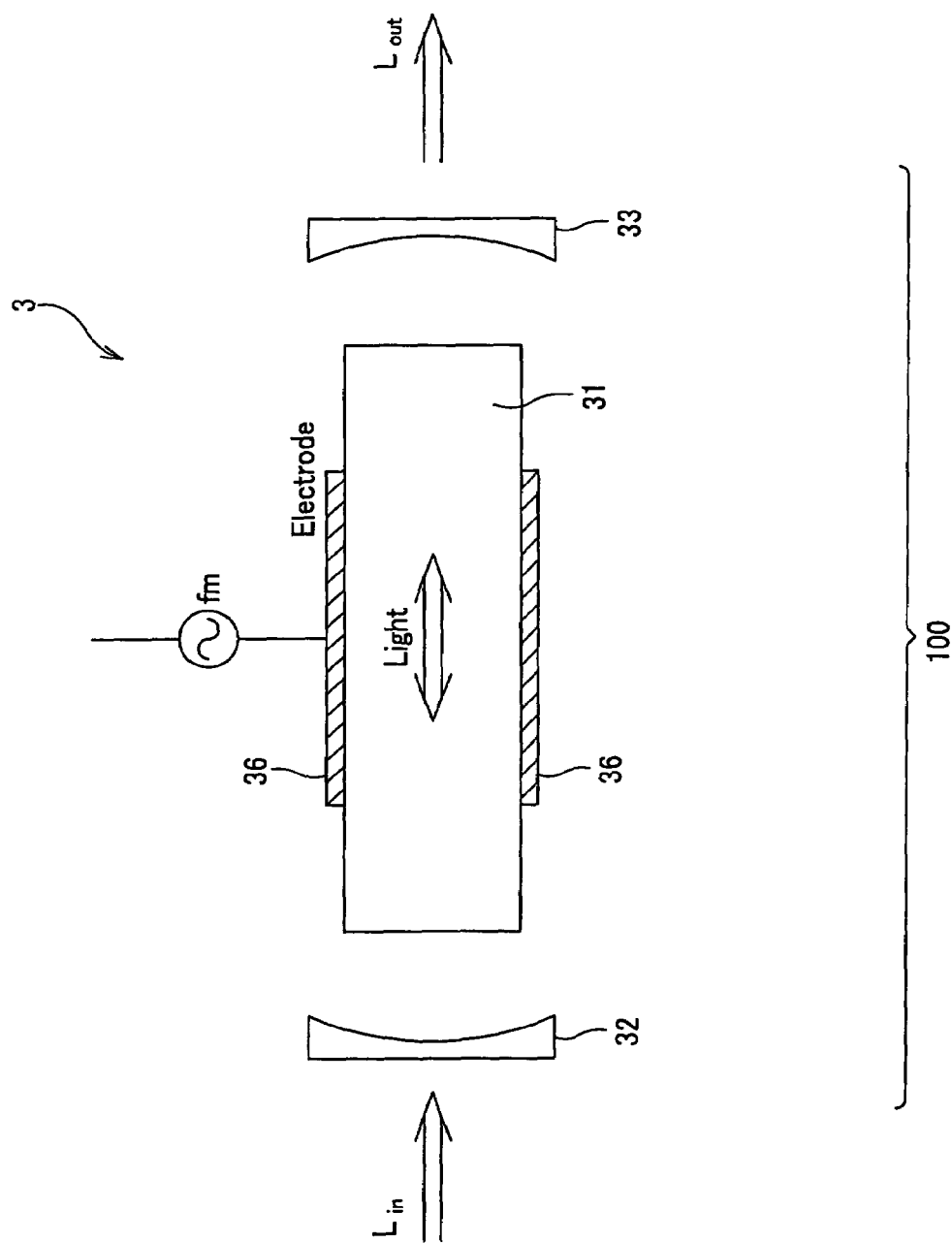
FIG. 1 is a schematic illustration of the principle of structure of a known optical frequency comb generator.
Figure 2:
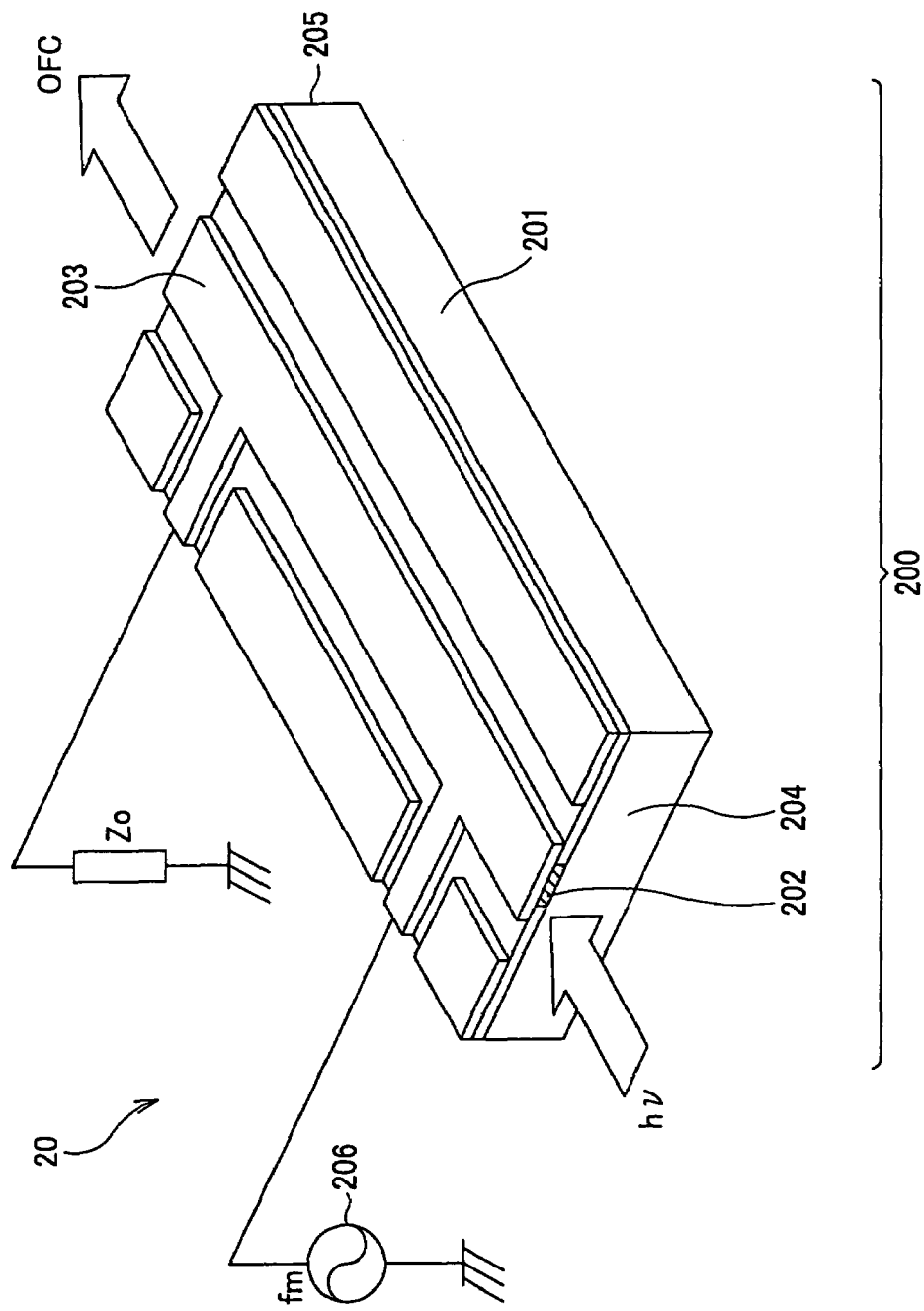
FIG. 2 is a schematic illustration of the principle of structure of a known waveguide type optical frequency comb generator.
Figure 3:
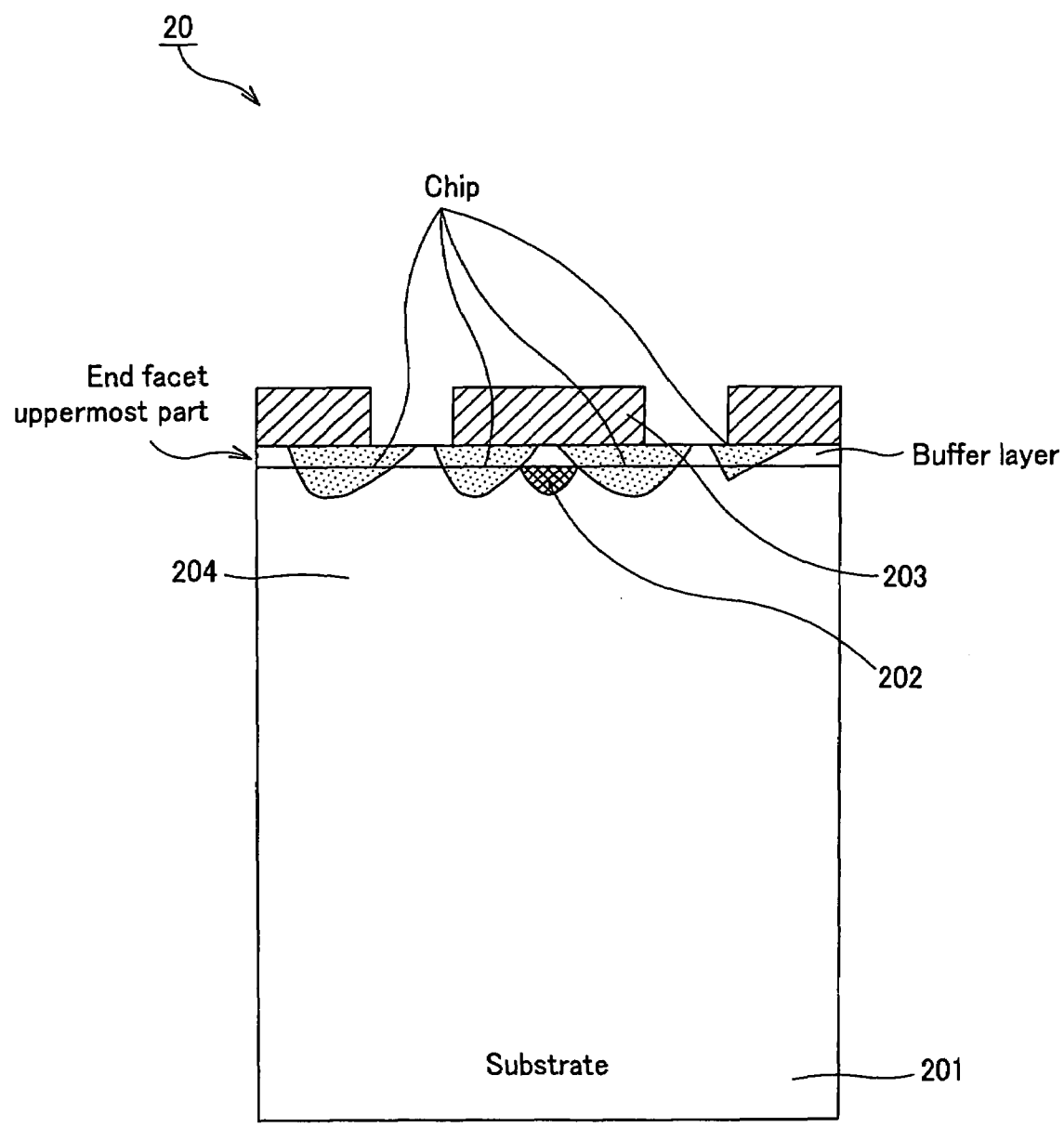
FIG. 3 is a schematic illustration of an end facet of a known waveguide type optical frequency comb generator where an incidence side reflection film is formed.
Figure 4:
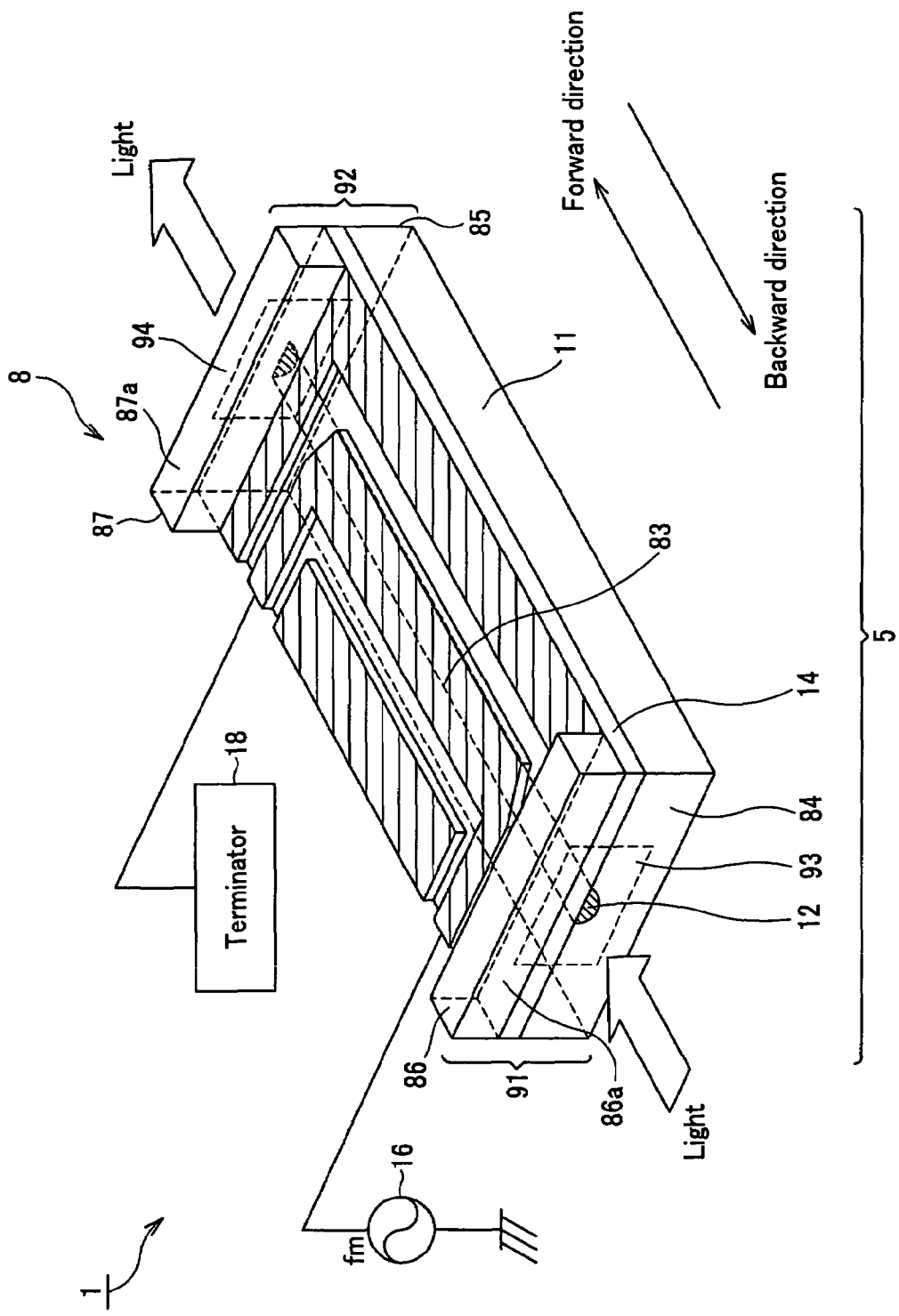
FIG. 4 is a schematic illustration of an optical modulator according to the present invention, showing the configuration thereof.
Figure 5:
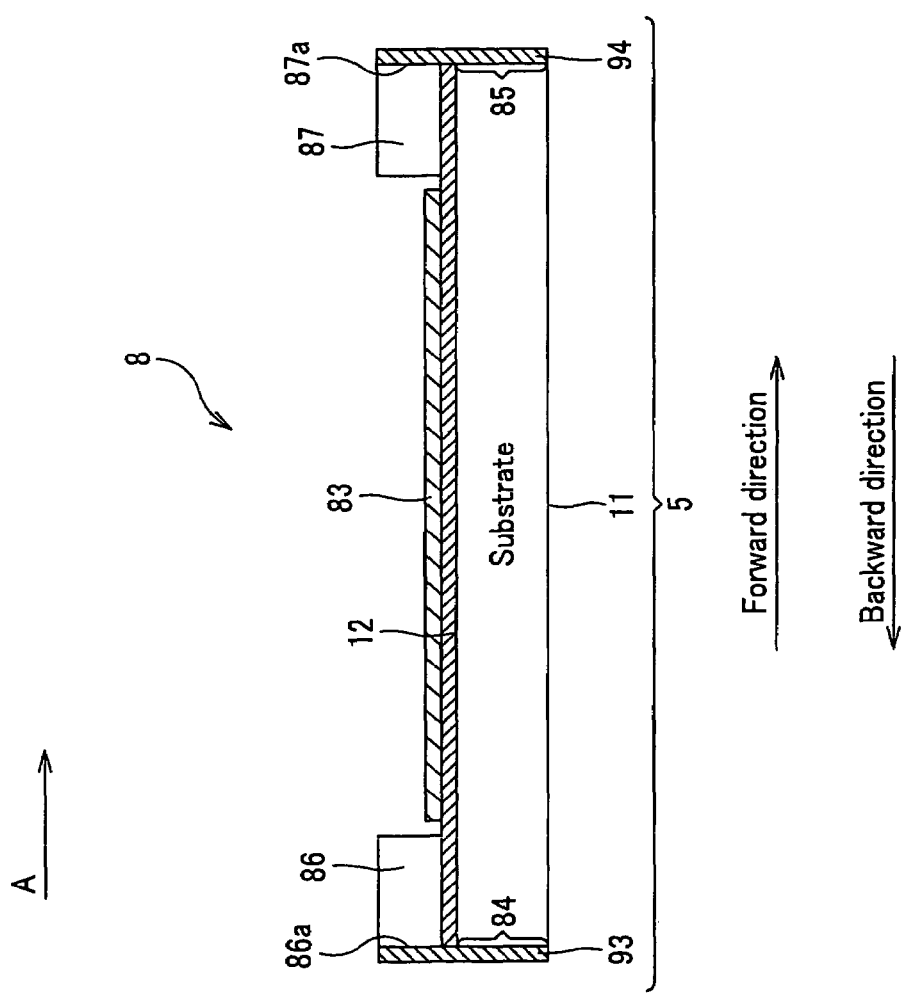
FIG. 5 is a schematic lateral view of the optical modulator of FIG. 4.

FIGS. 4 and 5 schematically illustrate an optical modulator 8 according to the present invention. The optical modulator 8 includes a substrate 11, a waveguide 12 formed on the substrate 11 to modulate the phase of propagating light, a buffer layer 14 laid on the substrate 11 so as to cover the waveguide 12, an electrode 83 formed on the top surface of the waveguide 12 in such a way that the direction of the modulation electric field is substantially perpendicular to the direction of propagation of light, a first end facet 84 and a second end facet 85 arranged opposite to each other with the waveguide 12 interposed between them, a first protection member 86 arranged at an upper part of the waveguide 12 so as to form an identical plane with the first end facet 84, a second protection member 87 formed at an upper part of the waveguide 12 so as to form an identical plane with the second end facet 85, an incidence side reflection film 93 laid on the plane 91 formed between the first end facet 84 and an end facet 86a of the first protection member 86, an emission side reflection film 94 laid on the plane 92 formed between the second end facet 85 and an end facet 87a of the second protection member 87, an oscillator arranged at the side of one of the opposite ends of the electrode 83 to oscillate a modulation signal of frequency fin and a terminator 18 arranged at the side of the other end of the electrode 83.

The substrate 11 is typically formed by cutting a large crystal of $LiNbO_3$ or GaAs with a diameter of 3 to 4 inches grown by a pulling method into a wafer. The surface of the substrate 11 produced by cutting is then subjected to a mechanical polishing process and/or a chemical polishing process.

The waveguide 12 is formed so as to run through from the incidence side reflection film 93 to the emission side reflection film 94 and adapted to propagate resonated light. The refractive index of the layer of the waveguide 12 is set to be higher than that of any other layer such as the substrate 11. Light that enters the waveguide 12 is propagated through the waveguide 12 as it is totally reflected by the interface thereof. Generally, the waveguide 12 can be prepared by diffusing Ti atoms in the substrate 11 or by growing Ti atoms on the substrate 11 under epitaxial growth.

Note that an $LiNbO_3$ crystal optical waveguide may be used as the waveguide 12. An $LiNbO_3$ crystal optical waveguide can be formed by diffusing Ti atoms on the surface of a substrate 11 mainly made of $LiNbO_3$. As Ti is thermally diffused in the substrate 201 of $LiNbO_3$, light can be confined to the region where Ti is diffused as the region shows a refractive index higher than that of any other region. Thus, it is possible to prepare a waveguide 12 that can propagate light. An $LiNbO_3$ crystal type optical waveguide 12 prepared by the above described method provides electrooptic effects such as Pockels effect that the refractive index changes in proportion to the intensity of electric field and the Kerr effect that the refractive index changes in proportion to the square of the intensity of the electric field so that it is possible to modulate light, utilizing such physical phenomena.

The buffer layer 14 covers the waveguide 12 to suppress the propagation loss of light in the waveguide 12. Note that, the electric field intensity falls to reduce the modulation effect when the buffer layer 14 has a too large film thickness. Therefore, it is preferable to select a small film thickness within a range that does not significantly raise the light propagation loss.

The electrode 83 is made of a metal material such as Ti, Pt or Au and adapted to modulate the phase of light propagating through the waveguide 12 by driving and inputting the modulation signal of frequency fin supplied from the oscillator 16 into the waveguide 12.

Each of the first protection member 86 and the second protection member 87 is formed by a member corresponding to the material of the substrate 11. The first protection member 86 and the second protection member 87 may be made of a material same as that of the substrate 11. The end facet 86a of the first protection member 86 and the first end facet 84 that form the plane 91 may be processed so as to have the same crystal bearing relative to each other. Similarly, the end facet 87a of the second protection member 87 and the second end facet 85 that form the plane 92 may be processed so as to have the same crystal bearing relative to each other.

The incidence side reflection film 93 and the emission side reflection film 94 are arranged in parallel with each other in order to resonate light that enters the waveguide 12 and form the resonator 5 for resonating light by reciprocatingly reflecting light passing through the waveguide 12.

The incidence side reflection film 93 receives light of frequency $v_1$ from the light source. The incidence side reflection film 93 reflects light that is reflected by the emission side reflection film 94 and passed through the waveguide 12. The exit side reflection film 94 reflects light that is passed through the waveguide 12. It also emits light that is passed through the waveguide 12 to the outside at a predetermined ratio.

The incidence side reflection film 93 and/or the emission side reflection film 94 may be formed entirely along the planes 91 and 92 respectively, although they may alternatively be formed to minimally cover the respective ends of the waveguide 12.

The terminator 18 is a resistor fitted to the terminal of the electrode 83 and adapted to prevent the waveform of the electric signal from being disturbed by preventing the electric signal from being reflected at the terminal.

Figure 6:
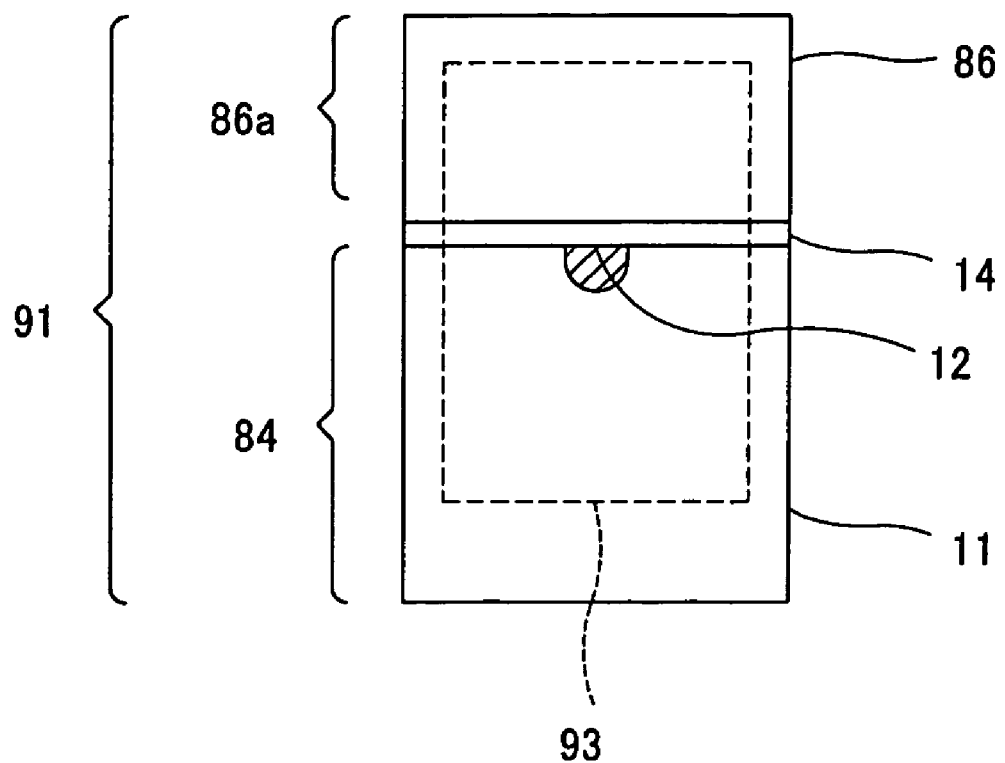
FIG. 6 is a schematic plan view of the plane of the optical modulator of FIG. 4 where the incidence side reflection film is formed.

FIG. 6 schematically illustrates the plane 91 where the incidence side reflection film 93 is formed as viewed in the direction A in FIG. 5.

An identical plane 91 is formed by the first end facet 84 of the waveguide 12 that includes the light entering end of the waveguide 12 and the end facet 86a of the protection member 86. The plane 91 that is formed in this way is inclined by an angle of not greater than 0.05°. The loss of light that arises when light having a beam diameter of $1/e^2$ is reflected by an end facet inclined by 0.05° relative to the plane 91 with the angle of inclination of 0.05° is computationally determined to be $4 \times 10^{-4}$, which is small and negligible if compared with the reflection factor of the incidence side reflection film 93.

As the first end facet 91 and the second end facet 92 are formed substantially perpendicular relative to the waveguide 12, it is possible to resonate light by means of the incidence side reflection film 93 and the emission side reflection film 94 that are laid respectively on them.

With the optical modulator 8 having the above-described configuration, light that is made to enter it from the outside by way of the incidence side reflection film 93 is propagated in the forward direction in the waveguide 12 and reflected by the emission side reflection film 94, while it is partly transmitted to the outside. Light reflected by the emission side reflection film 94 is propagated in the backward direction in the waveguide 12 and reflected by the incidence side reflection film 93. As such reflections are repeated, light resonates in the waveguide 12.

Additionally, it is possible to modulate the phase of light deeper by tens of several times than ever by using an electric signal that is synchronized with the time necessary for light to make a round trip in the waveguide 12 and driving it to enter from the electrode 83 if compared with light that is made to pass through the optical phase modulator 8 only once. With this arrangement, it is also possible to generate several hundreds of sidebands over a broad range with the center thereof at the frequency $v_1$. Note that all the frequency intervals fm of adjacent sidebands are equal to the frequency fm of the input electric signal. Therefore, the optical modulator 8 can also be used as an optical frequency comb generator adapted to use a large number of sidebands.

Figure 7:
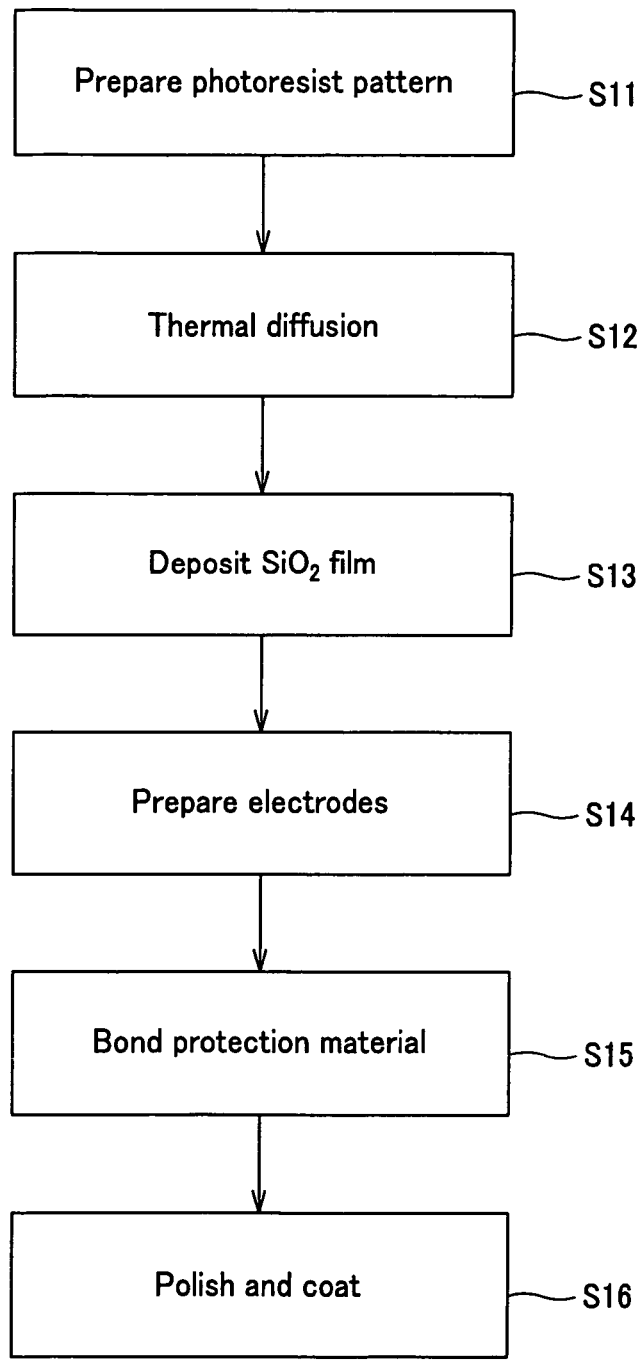
FIG. 7 is a flowchart of the method of manufacturing an optical modulator according to the present invention.

Now, the method of preparing an optical modulator 8 according to the present invention will be described below by referring to FIG. 7.

Figure 8A:
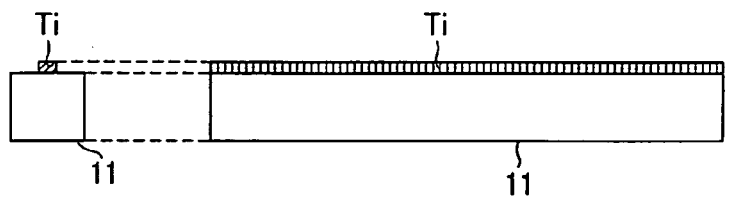
FIGS. 8A, 8B, 8C, 8D, 8E and 8F are schematic illustrations of an optical modulator according to the present invention, showing the structure thereof in different manufacturing steps corresponding to the flowchart of FIG. 7.

Firstly, in Step S11, a photoresist pattern is formed on the surface of a substrate 11 made of $LiNbO_3$ crystal and Ti is deposited by evaporation thereon as shown in FIG. 8A. Then, the photoresist is removed to produce Ti micro-wires having a width of microns.

Figure 8B:
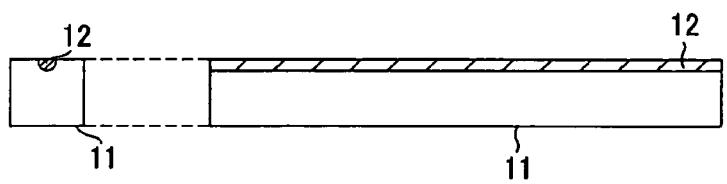

Then, in Step S12, Ti atoms are thermally diffused in the substrate 11 to form a waveguide 12 as shown in FIG. 8B by heating the substrate 11 where Ti micro-wires are formed.

Note that Ti atoms may not necessarily be diffused in the substrate 11 in the Steps S11 and S12 of preparing a waveguide 12. More specifically, they may be replaced by a step using a proton exchange method of substituting Li with $H^+$ by immersing $LiNbO_3$ crystal in benzoic acid.

Figure 8C:
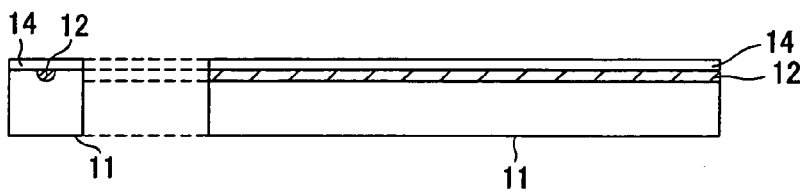

Then, in the next step, or Step S13, an SiO$_2$ thin film is formed as buffer layer 14 on the surface of the substrate 11 by deposition as shown in FIG. 8C. Alternatively, in Step S13, a buffer layer 14 may be formed by applying an SiO$_2$ wafer to the surface of the substrate 11. If such is the case, the film thickness may be controlled by polishing the deposited buffer layer 14, considering the region for arranging an electrode in Step S14, which will be described hereinafter.

Figure 8D:
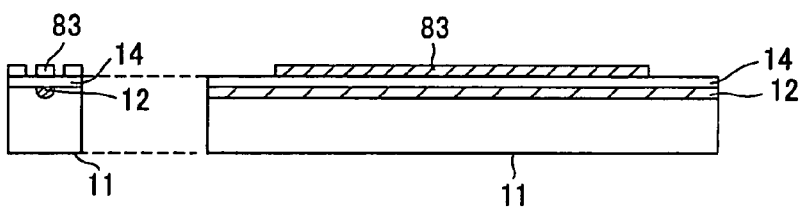
Figure 8E:
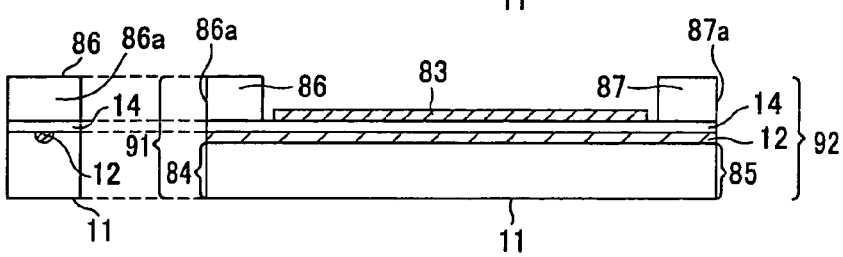

Then, in the nest step, or Step S14, an electrode 83 is formed on the buffer layer 14 as shown in FIG. 8D. In Step S15, protection members 86, 87 are bonded to an upper part of the waveguide 12 as shown in FIG. 8E. The protection members 86, 87 may be bonded by means of an adhesive agent or by means of some other direct bonding method. When the substrate 11 is made of LiNbO$_3$ crystal, the protection members 86, 87 may also be made of the same material, or LiNbO$_3$. In Step S15, the applied protection members 86, 87 are cut so as to make their end facets 86a, 87a form planes 91, 92 with the first end facet 84 and the second end facet 85 of the substrate 11 respectively.

Figure 8F:
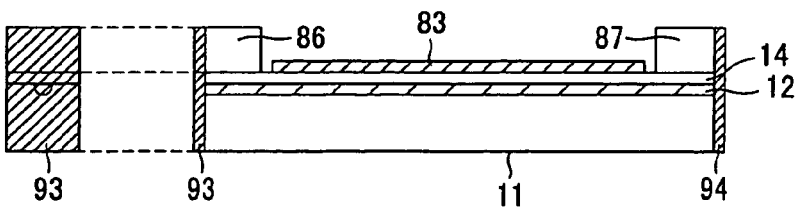

Then, in the last step, or Step S16, the obtained planes 91, 92 are polished as shown in FIG. 8F. Then, an incidence side reflection film 93 and an emission side reflection film 94 are formed respectively on the entire polished planes 91, 92. Alternatively, in Step S16, it may alternatively be so arranged that the incidence side reflection film 93 and the emission side reflection film 94 are formed on the planes 91, 92 and polished.

Since protection members 86, 87 are bonded to the respective ends of the optical modulator 8 according to the present invention, the end facets of the waveguide that are conventionally located at the top corners of the end facets of the optical modulator 8 are now located substantially at the centers of the planes 91, 92, as shown in FIG. 6. Then, as a result, if the corner of either of the planes 91, 92 is chipped in the polishing operation in Step S16, the corresponding end facet of the waveguide 12 is not chipped. In other words, the end facets of the waveguide 12 can hardly be chipped. Thus, it is possible to minimize the loss of light from either of the end facets of the waveguide 12.

As the protection member 86, 87 are made of an appropriate material that correspond to the material of the substrate 11, the first end facet 84 of the substrate 11 through the end facet 86a of the waveguide 12 and the second end facet 85 of the substrate 11 through the end facet 87a of the waveguide 12 can be polished at a uniform polishing rate in Step S16. Then, the end facets of the waveguide 12 are no longer rounded in the polishing step to provide very flat polished planes 91, 92. Thus, it is possible to minimize the reflection loss at the end facets of the waveguide 12. The reflection loss can be further reduced by making the end facets of each of the planes 91, 92 have the same crystal bearing.

Further, by arranging the protection members 86, 87 purposely, the accuracy of the polishing process in Step S16 is improved and the perpendicularity of the obtained plane 91 (92) relative to the waveguide 12 is also improved. Thus, it is possible to minimize the loss of light from the loss of the perpendicularity.

As a result of arranging the protection members 86, 87, it is possible to minimize the fluctuations in the film thickness that are produced as the incidence side reflection film 93 and the emission side reflection film 94 to be firmly laid move from the respective planes 91, 92 to other lateral surfaces. Then, it is possible to optimize the film thickness at and near the end facets of the waveguide 12, which is vital for securing the necessary reflection factor. In other words, the reflection factor can be improved than ever.

Since the incidence side reflection film 93 and the emission side reflection film 94 are formed over large areas respectively extending from the first end facet 84 and the second end facet 85 of the substrate 11 to the end facets 86a, 87a, they are very stable and hardly peeled off. Additionally, the present invention provides an enhanced degree of reproducibility in terms of film forming.

In an experiment for examining the effect of arranging the protection members 86, 87 according to the present invention, the planes 91, 92 where the protection members 86, 87 are bonded, were polished to find that neither chip nor bend takes place at the end facets of the waveguide 12 and the optical polishing operation was perfect to make planes 91, 92 very flat and good for laying the incidence side reflection film 93 and the emission side reflection film 94 there.

Particularly, when the first protection member 86 and the second protection member 87 are made of a material same as that of the substrate 11 and the end facets 86a, 87a of the protection members 86, 87 and the first and second end facets 84, 85 that form the planes 91, 92 are processed to show the same bearing, they show the same crystal hardness so that the planes 91, 92 would not become inclined due to the use of different polishing rates.

Thus, as the protection members 86, 87 are bonded to the ends of the optical modulator 8 according to the present invention, the end facets of the waveguide 12 are moved substantially to the centers of the respective planes 91, 92. With this arrangement, the present invention provides the following advantages. The end facets of the waveguide 12 are free from chips and roundedness. The waveguide 12 is held perpendicular to the planes 91, 92. The accuracy of polishing the planes 91, 92 is improved. The incidence side reflection film 93 and the emission side reflection film 94 are prevented from being peeled off and moving round. The reflection factor of the incidence side reflection film 93 and that of the emission side reflection film 94 are improved. The design reflection characteristics are realized. The performances of the reflection films are reproducible. Then, as a result, it is possible to improve the finesse of the resonator 5 having the incidence side reflection film 93 and the emission side reflection film 94 and manufacture optical modulators and an optical frequency comb generators that show excellent performances with an enhanced degree of reproducibility and a high yield.

In an experiment, optical modulators 8 having the above-described configuration were prepared by laying reflection films 93, 94 showing a reflection factor of 97% respectively on the polished planes 91, 92. As a result, it was possible to achieve a degree of finesse of 61 when the crystal length of the waveguide 12 was made equal to 27.4 mm (to be referred to as short resonator hereinafter). Similarly, it was possible to achieve a degree of finesse of 38 when the crystal length of the waveguide 12 was made equal to 54.7 mm (to be referred to as long resonator hereinafter). In view of the fact that the degree of finesse of conventional waveguide type optical resonators is maximally 30 (IEEE Photonics Technology Letters, Vol. 8, No. 10, 1996), it will be appreciated that an optical modulator 8 according to the present invention, where the accuracy of polishing the end facets and that of coating are improved, can dramatically improve the finesse. Particularly, all the six prepared sample optical modulators 8 achieved a degree of finesse above 30 to prove that the reproducibility of the manufacturing process is high.

Figure 9:
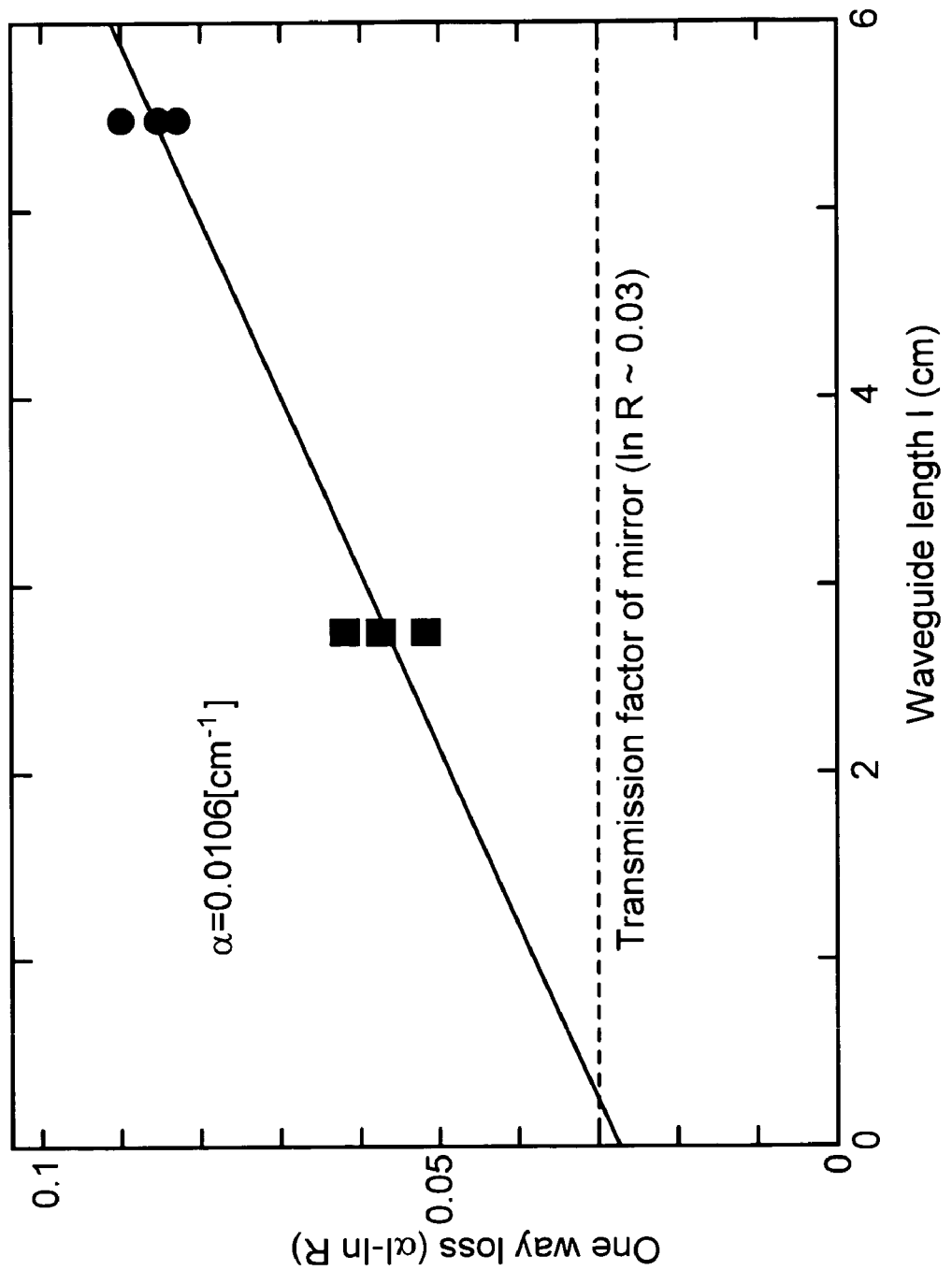
FIG. 9 is a graph illustrating the loss characteristics of an optical modulator according to the present invention, showing some of the results of an experiment.

FIG. 9 illustrates the internal loss of the waveguides 12 of the resonators 5 prepared in the above-described experiment either in the forward direction or in the backward direction. The losses of the three samples of optical modulator 8 including a long resonator were observed in a direction of propagation and plotted in FIG. 9 (as indicated by round marks in FIG. 9). Similarly, the losses of the three samples of optical modulator 8 including a short resonator were observed in a direction of propagation and plotted in FIG. 9 (as indicated by square marks in FIG. 9). Then, the marks were approximated by a straight line.

From the obtained straight line, if the reflection factor of the reflection films 93, 94 is R and the loss per unit length of the waveguide 12 is α, the internal loss Ls in a direction of propagation of the waveguide 12 having a resonator 5 with a length of 1 is expressed by Ls=α1−lnR when the loss is small. If the observed degree of finesse is F, the loss Ls in a direction of propagation is determined by Ls=π/F. It will be appreciated from the graph of FIG. 9 where the internal loss Ls is determined from the observed degree of finesse F that the internal loss of the waveguide 12 increases as the crystal length of the waveguide 12 increases.

Note that, in FIG. 9, the internal loss that arises when the length of the resonator 5 is 0 is due to the loss that arises at the end facets of the crystal. More specifically, since the reflection films 93, 94 showing a reflection factor of 97% (a transmission factor of 3%) are coated, a loss of 3% arises as minimum. However, it will be appreciated from FIG. 9 that there is no significant loss except the loss due to the transmission through the reflection films 93, 94 on the planes 91, 92.

Similarly, when the optical modulator 8 is applied to an optical frequency comb generator, the planes 91, 92 are polished and the incidence side reflection film 93 and the emission side reflection film 94 are laid in a condition where the protection members 86, 87 have been applied to consequently make it possible to improve the reflection factor of the reflection films 93, 94. Then, as a result, it is possible to improve the finesse of the resonator 5 and extend the frequency range for generating sidebands.

When the optical modulator 8 is applied to an optical frequency comb generator, the incidence side reflection film 93 may be replaced by a narrow band filter that transmits only light entering the waveguide 12 and reflects the sidebands generated in the waveguide 12. The efficiency of transforming incident light into sidebands can be improved by replacing the incidence side reflection film 93 by such a narrow band filter.

Similarly, the emission side reflection film 94 may be replaced by a filter for flattening the output spectrum. In ordinary optical frequency comb generators, the intensity of light of the obtained sidebands rapidly decreases exponentially as the sideband number increases. Therefore, it is possible to flatten the intensity of light of each obtained sideband by replacing the emission side reflection film 94 by a filter having characteristics good for offsetting the decrease in the intensity of light as a function of the degree.

Note that both the incidence side reflection film 93 and the emission side reflection film 94 may be replaced respectively by the above-described filters or either of the reflection films 93, 94 may be replaced by the corresponding filter.

Also note that an optical modulator 8 and an optical frequency comb generator realized by applying an optical modulator 8 according to the present invention are of the monolithic type where an incidence side reflection film 93 and an emission side reflection film 94 are directly formed relative to the planes 91, 92. In other words, the reflection films 93, 94 are not arranged at positions separated from the respective planes 91, 92 in the optical modulator 8 so that the FSR (free spectral range) of the resistor 5 is governed by the crystal length of the crystal of the waveguide 12 from the plane 91 to the plane 92 after the polishing step, or Step S16.

For this reason, the crystal length of the optical modulator 8 is required to be accurately and rigorously controlled so as to make integer times of the FSR of the optical resonator 5 equal to the desired modulation frequency.

If, for example, the FSR of the resonator 5 is made to agree with frequency $f_{FSR}$ by making the crystal length (the distance from the first end facet 84 to the second end facet 85 of the substrate 11) of the waveguide 12 equal to the value expressed by formula (1) below;

$$L = c/2n_g f_{FSR} - c\tau_g/n_g \qquad (1),$$

(where c is the speed of light in vacuum)

taking the group refractive index $n_g$ of the waveguide 13 and the average value $\tau_g$ of the group delay time of the incidence side reflection film 93 and the emission side reflection film 94 into consideration. Then, it is possible to dramatically improve the modulation efficiency.

Figure 10:
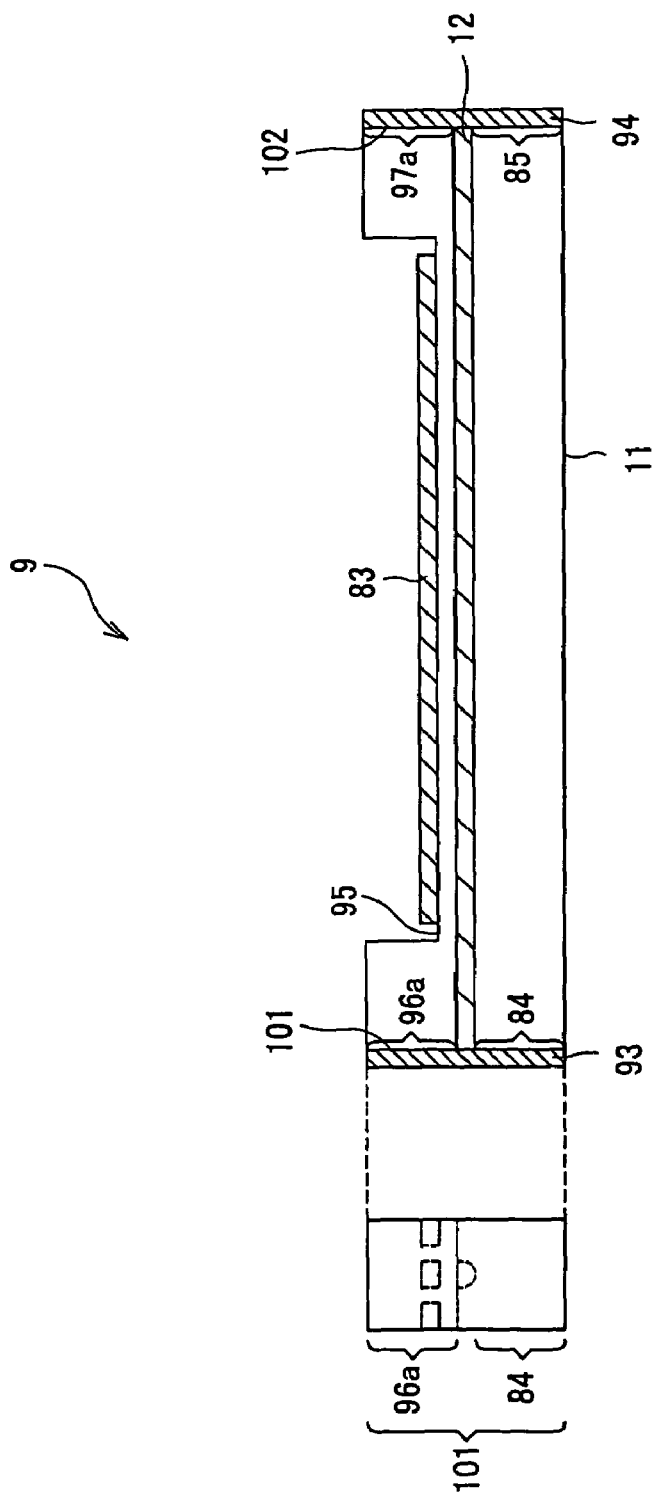
FIG. 10 is a schematic illustration of an optical modulator having a wafer taking both the role of a protection member and that of a buffer layer.

The present invention is by no means limited to the above-described embodiment. FIG. 10 is a schematic illustration of another embodiment of optical modulator 9 according to the present invention. The description of the components of the above-described optical modulator 8 given above by referring to FIGS. 4 and 5 is also applicable to the components of the optical modulator 9 of this embodiment that are same as of similar to them.

The optical modulator 9 includes a substrate 11, a waveguide 12 formed on the substrate 11 to modulate the phase of light propagating through it, a wafer 95 arranged on the top surface of the waveguide 12, an electrode 83 arranged on the top surface of the wafer 95 in such a way that the direction of the modulation electric field is substantially perpendicular to the direction of propagation of light, a first end facet 84 and a second end facet 85 arranged opposite to each other with the waveguide 12 interposed between them, an incidence side reflection film 93 laid on the plane 101 formed between the first end facet 84 and an end facet 96a of the wafer 95, and an emission side reflection film 94 laid on the plane 102 formed between the second end facet 85 and an end facet 97a of the wafer 95.

As in the case of the above-described optical modulator 8, an oscillator for oscillating a modulation signal with frequency fin and a terminator are connected to the optical modulator 9.

The wafer 95 is typically made of $SiO_2$ and formed so as to have a length substantially same as that of the waveguide 12 and show a U-shaped profile. The wafer 95 is formed so as to show a large thickness only at the opposite end parts thereof and a small thickness only at the central part thereof where the electrode 83 is arranged. With this arrangement, it is possible to efficiently apply a modulation electric field to light propagating in the waveguide 12 from the electrode 83.

The wafer 95 takes the role of the above-described buffer layer 14 and suppresses the loss of light when the waveguide 12 formed immediately under the surface of the substrate 11 is coated. The wafer 95 also takes the role of the first protection member 86 and that of the second protection member 87 of the above-described optical modulator 8. Thus, the wafer 95 is cut in such a way that its end facets 96a, 97a respectively form planes 101, 102 with the first end facet 84 and the second end facet 85.

When arranging the wafer 95, the $SiO_2$ wafer whose opposite ends are made to show a right thickness is bonded onto the substrate 11 and the part thereof for arranging the electrode 83 is cut to show a U-shaped profile as shown in FIG. 10.

Thus, the optical modulator 9 provides advantages similar to those of the optical modulator 8 and an additional advantage of saving the efforts required to fit the protection members.

Figure 11A:
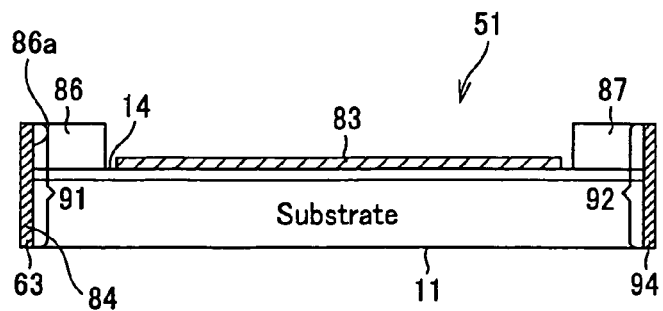
FIGS. 11A, 11B and 11C are schematic illustrations of a reciprocating modulation type optical modulator according to the present invention, showing the configuration thereof.
Figure 11B:
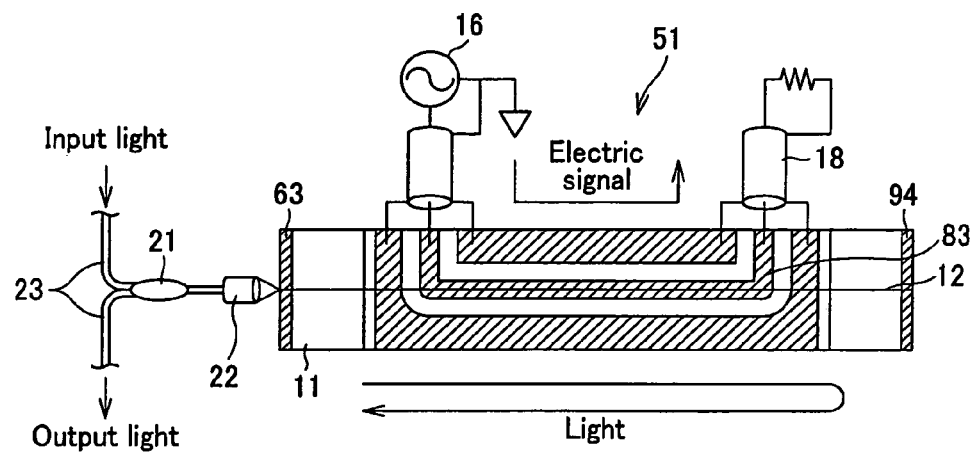
Figure 11C:
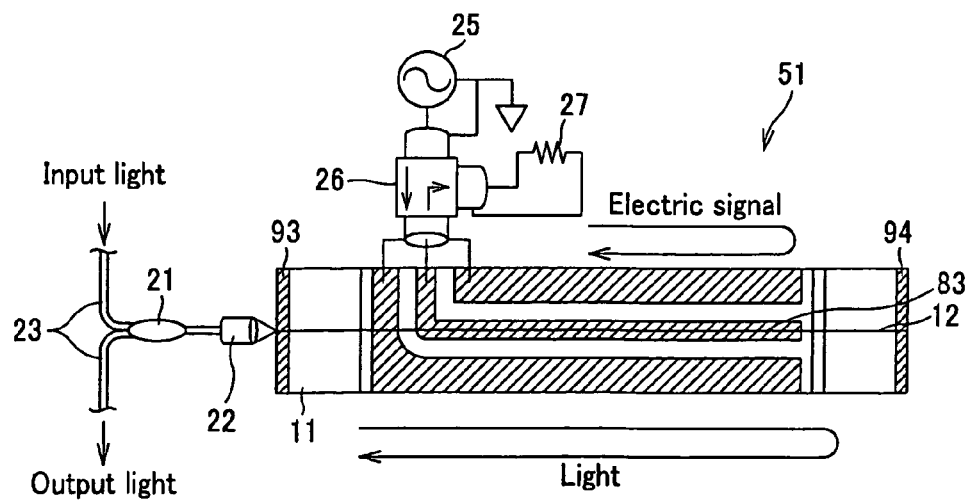

The present invention is by no means limited to the above-described embodiments. For example, the present invention can also be applied to a reciprocating modulation type optical modulator 51 as shown in FIGS. 11A through 11C. The configuration and the components of the optical modulator 51 that are same as or similar to those of the optical modulator 8 described above by referring to FIGS. 4 and 5 are denoted by the same reference symbols and will not be described here any further.

As shown in FIG. 11A, the optical modulator 51 includes a substrate 11, a waveguide 12 formed on the substrate 11 and adapted to modulate the phase of light propagating through it, a buffer layer 14 laid on the waveguide 12 on the substrate 11 to cover it, an electrode 83 arranged on the top surface of the waveguide 12 in such a way that the direction of the modulation electric field is substantially perpendicular to the direction of propagation of light, a first protection member 86 and a second protection member 87 arranged at respective upper parts of the waveguide 12, an anti-reflection film 63 laid on the plane 91 and an emission side reflection film 94 laid on the plane 92.

When the optical modulator 51 is actually put to use, as shown in FIG. 11B, an optical system including a light transmission path 23 typically made of an optical fiber so as to transmit input light from a light source or transmit output light output from the optical modulator 51 to the outside, an optical circulator 21 for separating the input light and the output light and a focuser 22 optically connected to the optical circulator 21 is mounted on it and an oscillator 16 to be arranged at the side of one of the opposite ends of the electrode 83 to oscillate a modulation signal of frequency fm and a terminator 18 to be arranged at the side of the other end of the electrode 83 are additionally provided.

The anti-reflection film 63 is laid on the plane 91 that is formed between the first end facet 84 and the end facet 86a of the first protection member 86. The anti-reflection film 63 may be made of a low reflection film or formed without coating to provide effects similar to those obtained when a low reflection film is laid.

The focuser 22 focuses the input light that has passed the optical circulator 21 to an end of the waveguide 12 and also the output light that has been transmitted through the anti-reflection film 63 from the end of the waveguide 12 so as to send it to the optical circulator 21. The focuser 22 may be formed by using a lens or the like for optically coupling the input light so as to make it show a spot diameter corresponding to the diameter of the waveguide 12.

The optical modulator 51 having the above described configuration operates as so-called reciprocating modulation type optical modulator as the emission side reflection film 94 is arranged as high reflection film at one of the opposite ends of the waveguide 12 and the anti-reflection film 63 is arranged at the other end of the waveguide 12. Then, input light entering the waveguide 12 is modulated as it is propagated through the waveguide 12 and reflected by the emission side reflection film 94 at the corresponding end facet. Then, it is propagated through the waveguide 12 again and transmitted through the anti-reflection film 63 so as to be emitted to the side of the focuser 22 as output light. At the same time, the electric signal of frequency fm supplied from the oscillator 16 propagates on the electrode 83, while modulating the input light, and becomes absorbed by the terminator 18.

Additionally, an oscillator 25 and a terminator 27 may be arranged at one of the opposite ends of the electrode 83 of the optical modulator 51 as shown in FIG. 11C and the electric signal supplied from the oscillator 25 may be propagated on the electrode 83 and reflected by the other end of the electrode 83. Still additionally, an isolator 26 for separating the electric signal supplied from the oscillator 25 and the electric signal reflected by the other end of the electrode 83 may be provided. An incidence side reflection film 93 having a high reflection factor is laid on the optical modulator 51. Then, as a result, it is possible to resonate light in the inside of the waveguide 12. Alternatively, the incidence side reflection film 93 may be replaced by an anti-reflection film 63 having a low reflection factor as described. With this arrangement, it is possible to make light reciprocate only once in the waveguide 12 while it is being modulated for the phase thereof.

Since it is possible to modulate the phase of light by means of the electric signal when the latter is moving forwardly and also when moving backwardly to improve the modulation efficiency if the reflection phase of the electric signal is adjusted according to the phase of light reflected by the emission side reflection film 94 of this optical modulator 51. The modulation efficiency can be improved further by bonding protection members 86, 87 to suppress the above described phenomenon of peeled films 63, 94 and chips and improve the finesse of the optical modulator 51.

Figure 12:
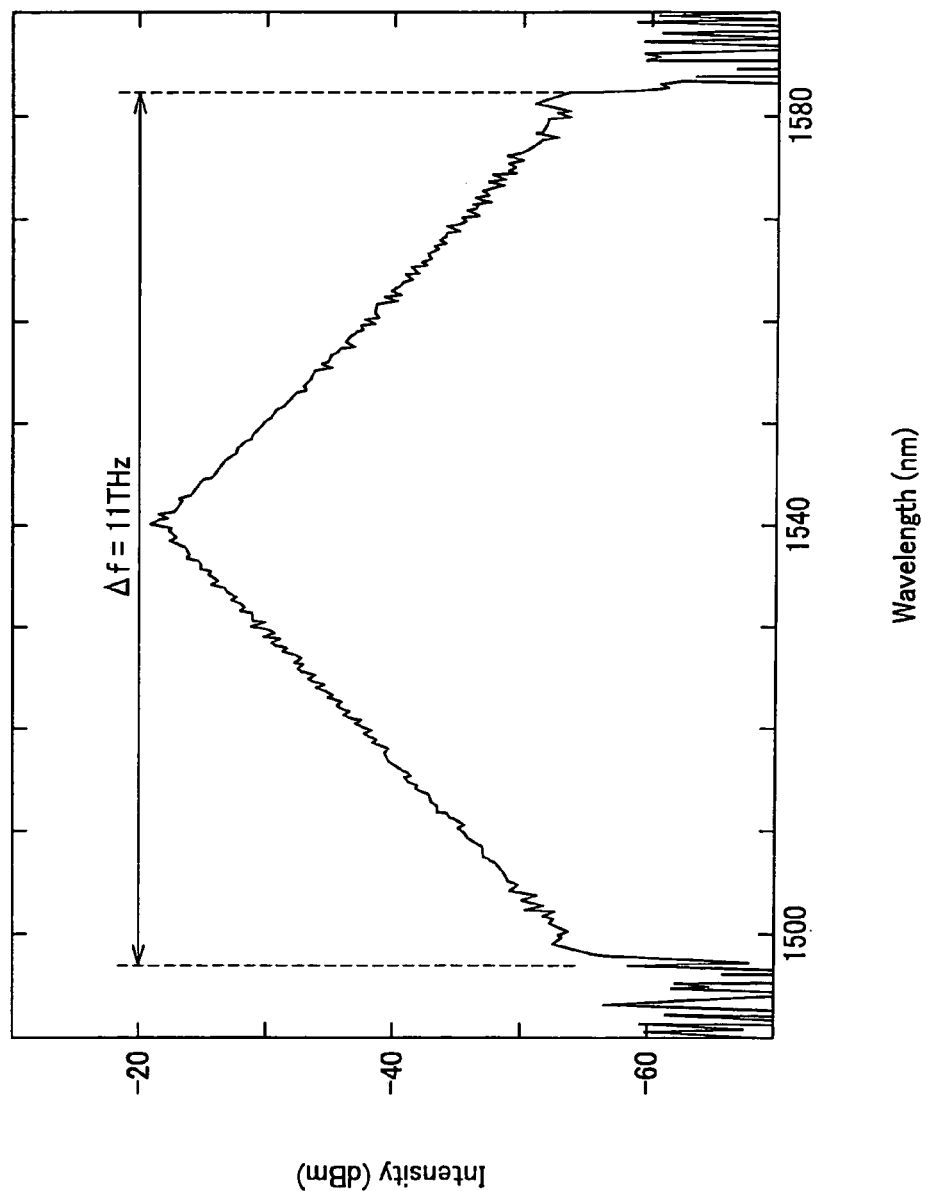
FIG. 12 is a graph illustrating the intensity distribution of sidebands of an optical frequency comb generator according to the present invention, showing the relationship between the wavelength and the intensity.

When any of the above-described optical modulator 51 is applied to an optical frequency comb generator, it is possible to modulate light resonating in the waveguide 12 when it is moving forward and also when it is moving backward by means of an electric signal reciprocating in the electrode. With such an arrangement, in the intensity distribution of sidebands in each frequency, the modulation index indicating the magnitude of the modulation applied in the waveguide 12 is expressed by $\pi$ radian in each direction of propagation when the modulation frequency of the electric signal applied to the electrode 83 is 25 G and the power of the electric signal is 0.5 W as shown in FIG. 12. Then, as a result, it will be seen that the half wavelength voltage $V_{90}$ that is defined as the voltage necessary for moving the phase by a half wavelength is 7.1V.

An optical modulator 8 formed by using a short resonator shows a high efficiency for generation of sidebands if compared with an optical modulator 8 formed by using a long resonator because of the high degree of finesse as described above and the frequency band width $\Delta f$ of the generated sidebands gets to 11 THz. While the electrode 83 of an optical modulator 8 formed by using a short resonator is as short as 20 mm, the optical modulator 8 provides a modulation efficiency comparable with that of an optical modulator 8 formed by using a long resonator. In other words, reciprocating modulation works very efficiently.

The optical modulator 51 may alternatively be arranged in such a way that electric signals are driven and input independently from the opposite ends of the electrode 83 by dividing the output of the oscillator 16 that operates as signal source in place of reflecting an electric signal. Still alternatively, independent oscillators 16 may be connected respectively to the opposite ends of the electrode 83.

Figure 13:
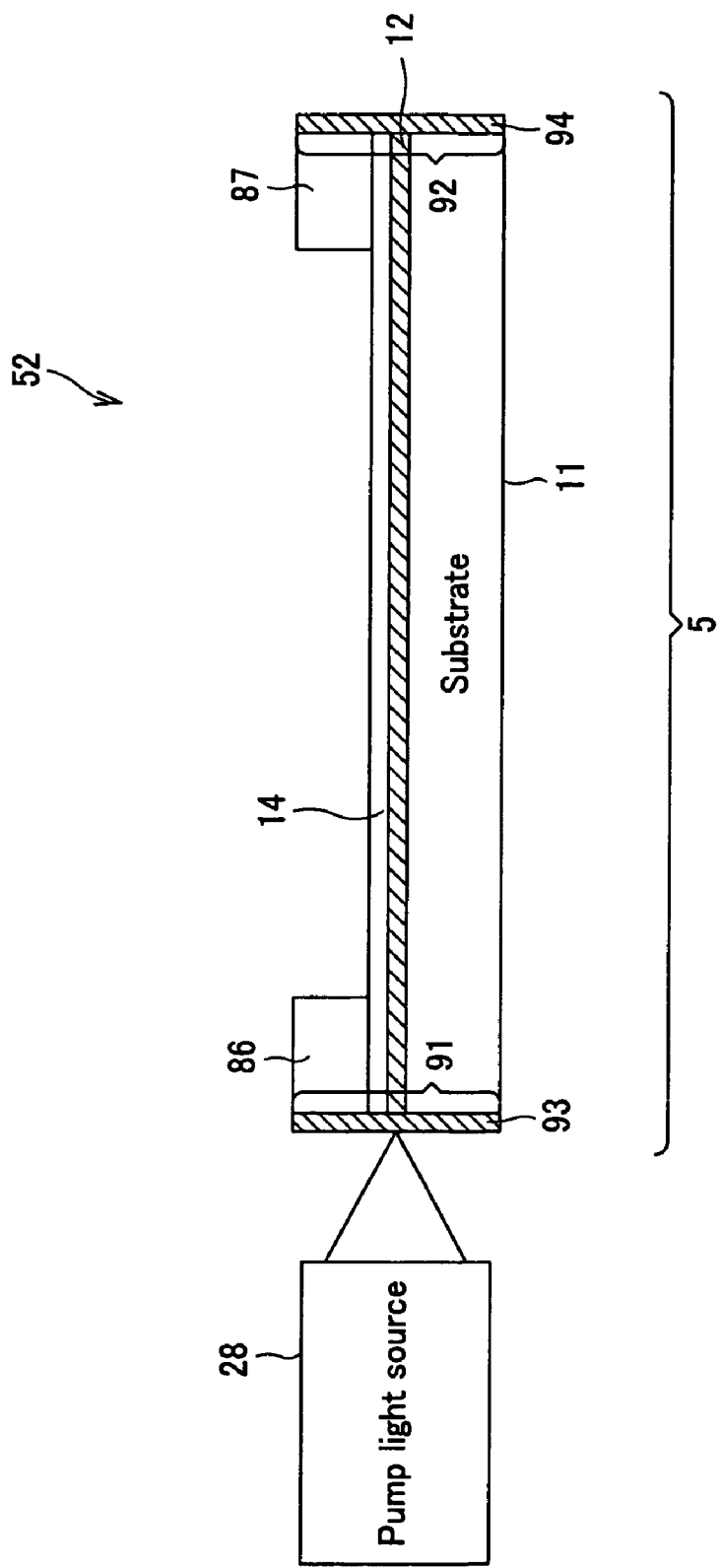
FIG. 13 is a schematic illustration of an optical waveguide type laser oscillator according to the present invention, showing the configuration thereof.

The present invention is also applicable to an optical waveguide type laser oscillator 52 as shown in FIG. 13. In FIG. 13, the components of the laser oscillator 52 that are same as or similar to those of the above-described optical modulator 8 illustrated in FIGS. 4 and 5 are denoted respectively by the same reference symbols and will not be described any further.

Referring now to FIG. 13, the laser oscillator 52 includes a substrate 11, a waveguide 12 formed on the substrate 11, a buffer layer 14 laid on the waveguide 12 on the substrate 11 to cover it, a first protection member 86 and a second protection member 87 arranged at respective upper parts of the waveguide 12, an incidence side reflection film 93 laid on plane 91 and an emission side reflection film 94 laid on plane 92 to form a resonator 5 between the incidence side reflection film 93 and the emission side reflection film 94. When the laser oscillator 52 is actually put to use, a pump light source 28 for emitting light with wavelength $\lambda_0$ is mounted on it.

An amplification medium such as erbium ions that absorbs light entering it by way of the incidence side reflection film 93 and shows a specific amplification characteristic relative to the wavelength of light is dispersed in the waveguide 12 of the laser oscillator 52. With this arrangement, it is possible to make the waveguide 12 operate as amplification medium for light. As light having an appropriate wavelength range is made to enter the waveguide 12 that operates as amplification medium, it operates also as optical amplifier for amplifying light of a specific wavelength that is determined by energy level. Additionally, it also operates as oscillator that amplifies light generated by transition of spontaneous emission and oscillates. The laser oscillator 52 operates for laser oscillation when the amplification factor exceeds the loss factor in the resonator 5. Therefore, it is possible to reduce the threshold value of laser oscillation by applying the protection members 86, 87 to prevent the reflection films 93, 94 from being peeled off and/or chipped and enhance the reflection characteristic at the end facets of the waveguide 12 so as to reduce the loss factor in the resonator 5.

The laser oscillator 52 can also be used for an optical parametric oscillator. In such a case again, oscillation takes place when the amplification factor exceeds the loss factor in the resonator 5. Therefore, it is possible to reduce the threshold value of oscillation by applying the protection members 86, 87 to prevent the reflection films 93, 94 from being peeled off and/or chipped and produce a resonator 5 having a high degree of finesse so as to reduce the loss factor in the resonator 5.

It is possible to provide the waveguide 12 with an amplification gain for an wavelength that is different from the wavelength of incident light without introducing any specific amplification medium into the waveguide 12 by forming the waveguide 12 by means of a nonlinear optical crystal such as LiNbO$_3$ crystal and utilizing the nonlinear polarization induced by incident light of the waveguide 12. For instance, the waveguide 12 may be formed by using a nonlinear optical crystal having a periodical polarization inversion structure.

A film showing a low reflection factor relative to light from the pump light source 28 and a high reflection factor relative to the wavelength of light oscillated by the waveguide 12 may be used for the incidence side reflection film 93 of the resonator 5 in the laser oscillator 52. Additionally, a film having a reflection factor that can provide an optimal output coupling relative to the wavelength of light oscillated by the waveguide 12 may be used for the emission side reflection film 94 of the resonator 5 in the laser oscillator 52.

As described above, the laser oscillator 52 and the optical parametric oscillator realized by using it provides advantages including that light can be confined to a narrow region and that the amplification factor is improved by raising the electric field intensity when the waveguide 12 is used. Particularly, the laser oscillator 52 can achieve a high degree of finesse if compared with conventional oscillators so that the advantages of the use of the waveguide 12 are further boosted.

Figure 14A:
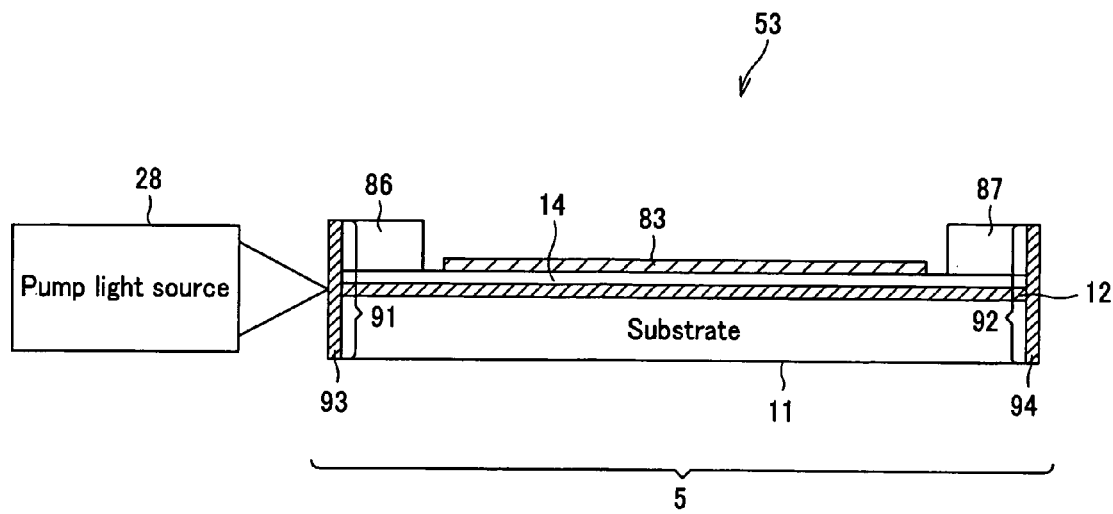
FIGS. 14A and 14B are schematic illustrations of another laser oscillator according to the present invention, showing the configuration thereof.
Figure 14B:
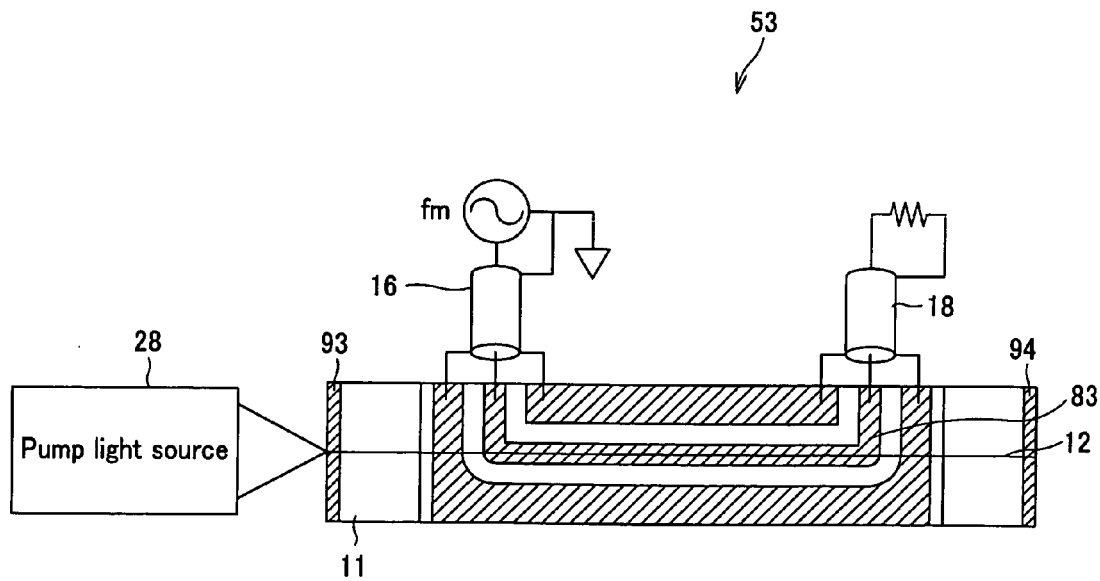

The present invention can also be applied to a mode locked laser oscillator 53 as shown in FIGS. 14A and 14B. Light with locked modes refers to light where the phases of a large number of modes of light oscillated with uniform frequency intervals are uniformized. In FIGS. 14A and 14B, the components of the laser oscillator 53 that are same as or similar to those of the optical modulator 8 and the laser oscillator 52 illustrated in FIGS. 4, 5 and 13 are denoted respectively by the same reference symbols and will not be described any further.

Referring to FIGS. 14A and 14B, the laser oscillator 53 includes a substrate 11, a waveguide 12 formed on the substrate 11 and adapted to modulate the phase of light propagating through it, a buffer layer 14 laid on the waveguide 12 on the substrate 11 to cover it, an electrode 83 arranged on the top surface of the waveguide 12 in such a way that the direction of the modulation electric field is substantially perpendicular to the direction of propagation of light, a first protection member 86 and a second protection member 87 arranged at respective upper parts of the waveguide 12, an incidence side reflection film 93 laid on plane 91 and an emission side reflection film 94 laid on plane 92 to form a resonator 5 between the incidence side reflection film 93 and the emission side reflection film 94. When the laser oscillator 53 is actually put to use, a pump light source 28 for emitting light with wavelength $\lambda_0$ is mounted on it and an oscillator 16 to be arranged at the side of one of the opposite ends of the electrode 83 to oscillate a modulation signal and a terminator 18 to be arranged at the side of the other end of the electrode 83 are additionally provided. Each of the incidence side reflection film 93 and the emission side reflection film 94 operates to lock the phases of the multiple of modes of laser oscillation.

The laser oscillator 53 having the above described configuration can operate for mode locked laser oscillation where the multiple of modes are locked as the electrode 83 is arranged at an upper part of the waveguide 12 of the above-described laser oscillator 52. When a modulation signal of a frequency that agrees with integer times of the FSR of the resonator 5 is driven and input from the oscillator 16, the phases of the modes are locked on the basis of the electrooptic effects of the waveguide 12 that oscillates an optical pulse of a multiple of modes so that the laser oscillator operates for mode locked laser oscillation.

As the modes are locked, the time waveform of light oscillated by the laser oscillator 53 becomes short pulses having a time width substantially equal to the opposite number of the amplified frequency bandwidth. Additionally, the waveform of the frequency axis becomes an optical frequency comb where sidebands are arranged at constant frequency intervals. Therefore, it is possible to use the laser oscillator 53 for observing the frequency of light and apply it to a multi-wavelength light source by optimally controlling it. It may be needless to say that the laser oscillator 53 can be used for an optical parametric oscillator like the above-described laser oscillator 52. Particularly, since the protection members 86, 87 are bonded to the laser oscillator 53, the reflection films 93, 94 are free from the problem of being peeled off and/or chipped to improve the degree of finesse of the entire resonator 5 and the laser oscillator 53 can operate efficiently for mode locked laser oscillation.

Note that the mode locked laser oscillation of a laser oscillator 53 is not limited to the above-described one that utilizes the electrooptic effects and may alternatively be based on any phenomenon so long as the laser oscillator is designed to exploit the nonlinear effects of optical elements in the resonator 5. For instance, it is possible to clearly set off the effects by using LiNbO$_3$ crystal for the waveguide 12.

Figure 15:
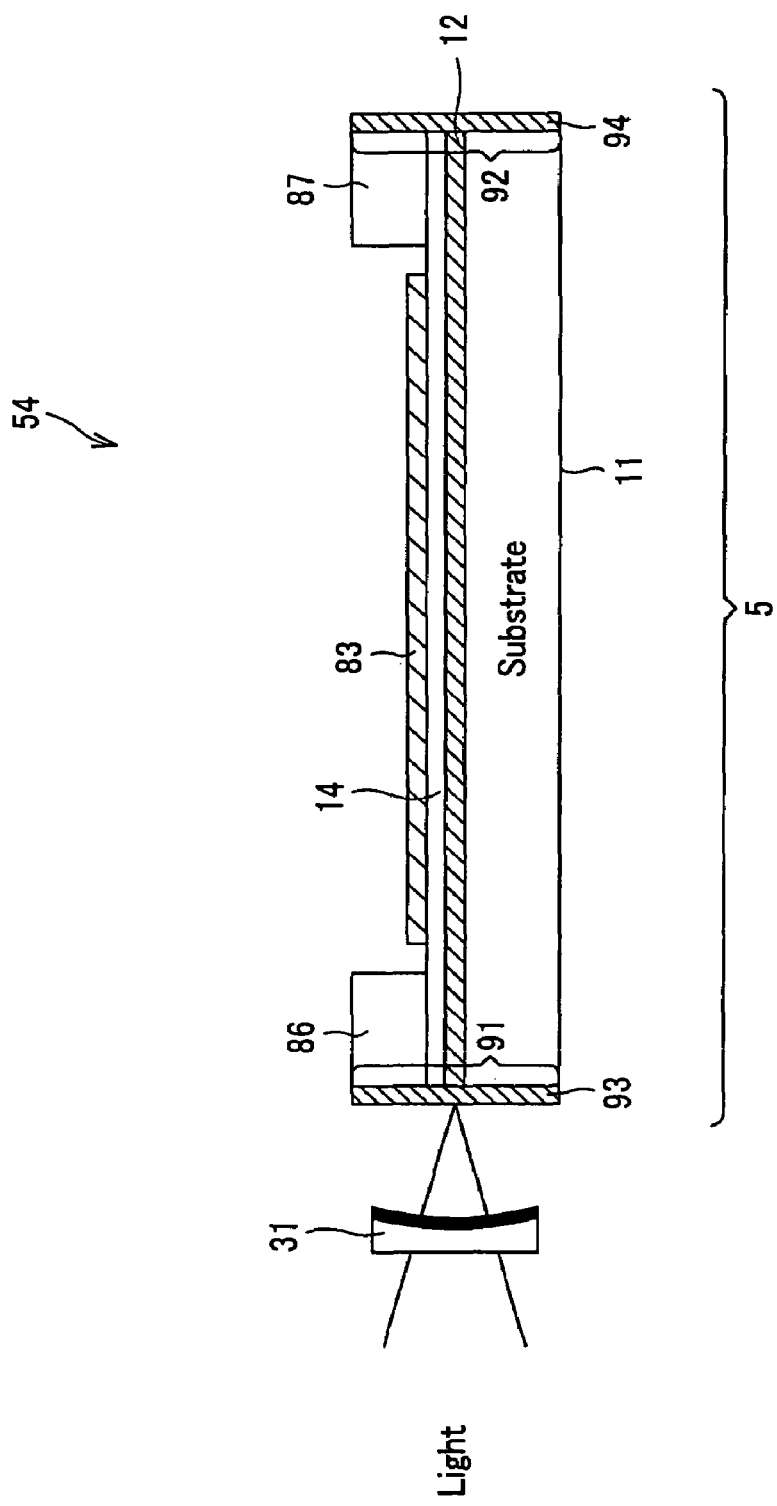
FIG. 15 is a schematic illustration of a modified FP electrooptic modulator according to the present invention.

The present invention can also be applied to a modified Fabry-Perot (FP) electrooptic modulator 54 as illustrated in FIG. 15. In FIG. 15, the components of the modified FP electrooptic modulator 54 that are same as or similar to those of the optical modulator 8 and the laser oscillator 52 illustrated in FIGS. 4, 5 and 13 are denoted respectively by the same reference symbols and will not be described any further.

Referring to FIG. 15, the modified FP electrooptic modulator 54 includes substrate 11, a waveguide 12 formed on the substrate 11 to modulate the phase of propagating light, a buffer layer 14 laid on the substrate 11 so as to cover the waveguide 12, an electrode 83 formed on the top surface of the waveguide 12 in such a way that the direction of the modulation electric field is substantially perpendicular to the direction of propagation of light, a first protection member 86 and a second protection member 87 formed respectively at upper parts of the waveguide 12, an incidence side reflection film 93 laid on the plane 91, an emission side reflection film 94 formed on the plane 92, a resonator 5 being formed between the incidence side reflection film 93 and the emission side reflection film 94. When the laser oscillator 53 is actually put to use, a reflector 31 is mounted and, if necessary, an oscillator to be arranged at the side of one of the opposite ends of the electrode to oscillate a modulation signal of frequency fm and a terminator to be arranged at the side of the other end of the electrode are provided.

The reflector 31 transmits light supplied from the outside and leads it to the end of the waveguide 12 at the side of the modified FP electrooptic modulator 54, while it reflects light emitted from the end of the waveguide 12. More specifically, the efficiency of transforming light entering the waveguide 12 into sidebands can be improved by arranging the reflector 31 because then it is possible to transmit only light entering the waveguide 12 and reflect the sidebands generated in the waveguide 12. In other words, the modified FP electrooptic modulator 54 can provide advantages similar to those provided when the incidence side reflection film 93 is replaced by a narrow band filter that transmits only light entering the waveguide 12 and reflects the sidebands generated in the waveguide 12. Particularly, since the protection members 86, 87 are bonded in the modified FP electrooptic modulator 54, the reflection films 93, 94 are free from being peeled of and/or chipped to improve the finesse of the entire resonator 5 and hence the efficiency of transforming light into sidebands.

An optical modulator 8 according to the present invention can be applied to a communication system 55 as will be described hereinafter.

Figure 16A:
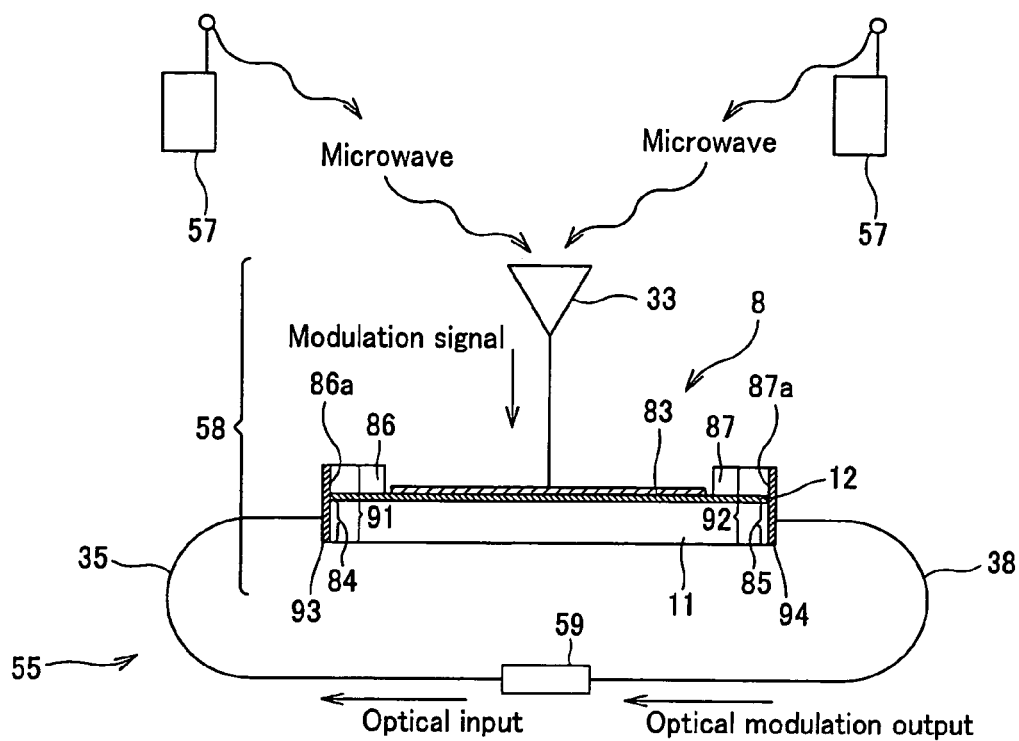
FIGS. 16A and 16B are schematic illustrations of a communication system where an optical modulator is mounted in each of the base stations thereof.

A system for code division multiple access that is based on a WDM communication method is typically applied to the communication system 55. As shown in FIG. 16A, the communication system 55 includes portable communication appliances 57, each of which is a mobile terminal that a pedestrian can carry, a plurality of base stations 58 for relaying communications by transmitting/receiving radio signals with any of the portable communication appliances 57 and a host control apparatus 59 for controlling communications in the entire network including the base stations 58 by way of optical fiber communication networks 35, 38 connected to it.

Each of the portable communication appliances 57 is adapted to be mounted in a vehicle or carried by a person so as to transmit/receive radio signals with the base station 58 arranged in the district where the portable communication appliance 57 is located. More specifically, while the portable communication appliance 57 may be an apparatus for fax communications or an apparatus mounted in a personal computer for data communications, it is generally a portable telephone set or a PHS (personal handy phone system) for voice communications. Thus, it is small and lightweight and specifically designed as portable appliance.

As shown in FIG. 16A, an optical modulator 8 is mounted in each of the base stations 58. An antenna 33 for transmitting/receiving a microwave with any of the portable communication appliances 57 is connected to the electrode 83 of the optical modulator 8. Light transmitted from the host control apparatus 59 by way of the optical fiber communication network 35 is partly made to enter the waveguide 12 of the optical modulator 8 by way of the incidence side reflection film 93. Light that is made to enter the waveguide 12 is resonated by the incidence side reflection film 93 and the emission side reflection film 94 that are arranged substantially in parallel with each other. Additionally, the optical modulator 8 can receive the microwave supplied from any of the portable communication appliances 57 by way of the antenna 33 and apply a modulation signal that corresponds to the microwave to light propagating in the waveguide 12 by way of the electrode 83 so that it can perform an operation of phase modulation on the light according to the information transmitted from the portable communication appliance 57. The optical modulator 8 emits the phase-modulated light by way of the emission side reflection film 94. The emitted light is then transmitted to the host control apparatus 59 by way of the optical fiber communication network 38.

The host control apparatus 59 generates light to be transmitted to the base stations 58 and obtain the detected output of any of the base stations 58 by performing an operation of photoelectric conversion on the light modulated at the base stations 58. In other words, the host control apparatus 59 can collectively control the detected outputs from various base stations.

In the communication system 55, light output from the host control apparatus 59 is transmitted to a target base station 58 by way of the optical fiber communication network 35. Then, the base station 58 propagates transmitted light in the waveguide 12 of the optical modulator 8 and performs an operation of phase modulation according to the microwave before it transmits the light to the host control apparatus 59 by way of the optical fiber communication network 38.

More specifically, when a portable communication appliance 57 located in the vicinity of a base station 58 makes a call, the light transmitted to the base station 58 is subjected to phase modulation that corresponds to the talk contained in the above-described microwave. On the other hand, when the portable communication appliance 57 located in the vicinity of a base station 58 does not make any call, the light transmitted to the base station 58 is not subjected to the above-described phase modulation. Thus, when the light transmitted from the base station 58 by way of the optical fiber communication network 38 has been subjected phase modulation, the host control apparatus 59 can obtain a detection output that corresponds to the talk by performing an operation of photoelectric conversion on it.

Since an optical modulator 8 having a resonator to which protection members 86, 87 are bonded and that shows a high degree of finesse is mounted in each base station 58 of the communication system 55, it is possible to increase the number of reciprocations of light propagating in the waveguide 12 and consequently improve the sensitivity of the optical modulator 8 itself.

Figure 16B:
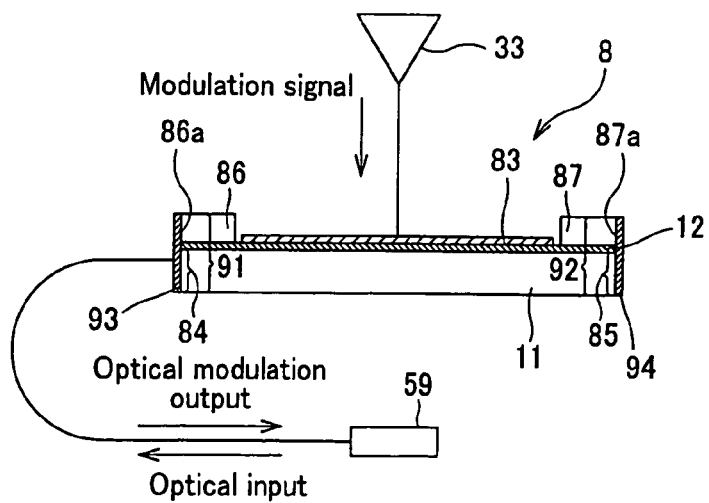

It may be appreciated that single core bidirectional optical transmission can be used for the communication system 55 as shown in FIG. 16B.

The crystal length LC1 of the waveguide 12 in the forward direction (backward direction) may be so adjusted as to be about 27 mm (or 54 mm) in an optical modulator 8 according to the present invention as shown in FIG. 4. The advantages of selecting such a crystal length will be described below.

Figure 17A:
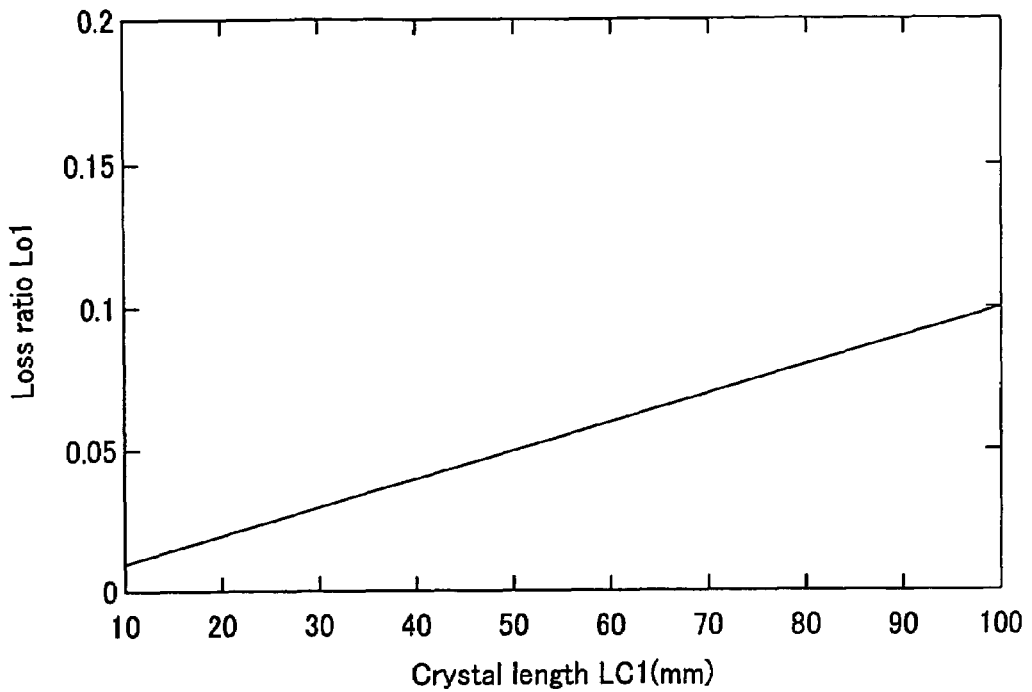
FIGS. 17A and 17B are graphs illustrating the performance of an optical modulator according to the present invention when the length is limited.
Figure 17B:
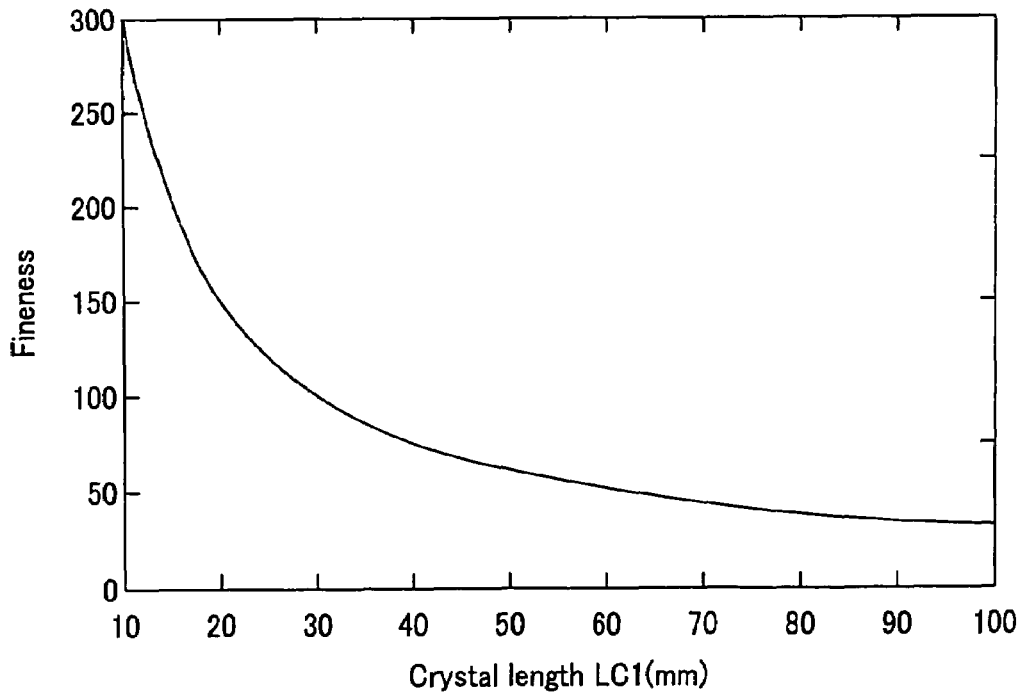

When the loss factor of light propagating in the forward direction (backward direction) in the waveguide 12 is Lo1, FIG. 17A shows the relationship between the loss factor Lo1 and the crystal length LC1 of the waveguide 12. As seen from FIG. 17A, the loss of propagating light gradually increases as the crystal length LC1 increases. FIG. 17B illustrates the relationship between the crystal length LC1 and the finesse. Finesse is generally expressed by π/Lo1 and, as seen from FIG. 17B, it is high when the crystal length LC1 is small.

The performance index of an optical modulator 8 can be expressed by Vπ/(finesse) (where Vπ is the voltage required for π radian modulation). Thus, an optical modulator 8 and an optical frequency comb generator including an optical modulator 8 perform excellently when the performance index is small.

Figure 18:
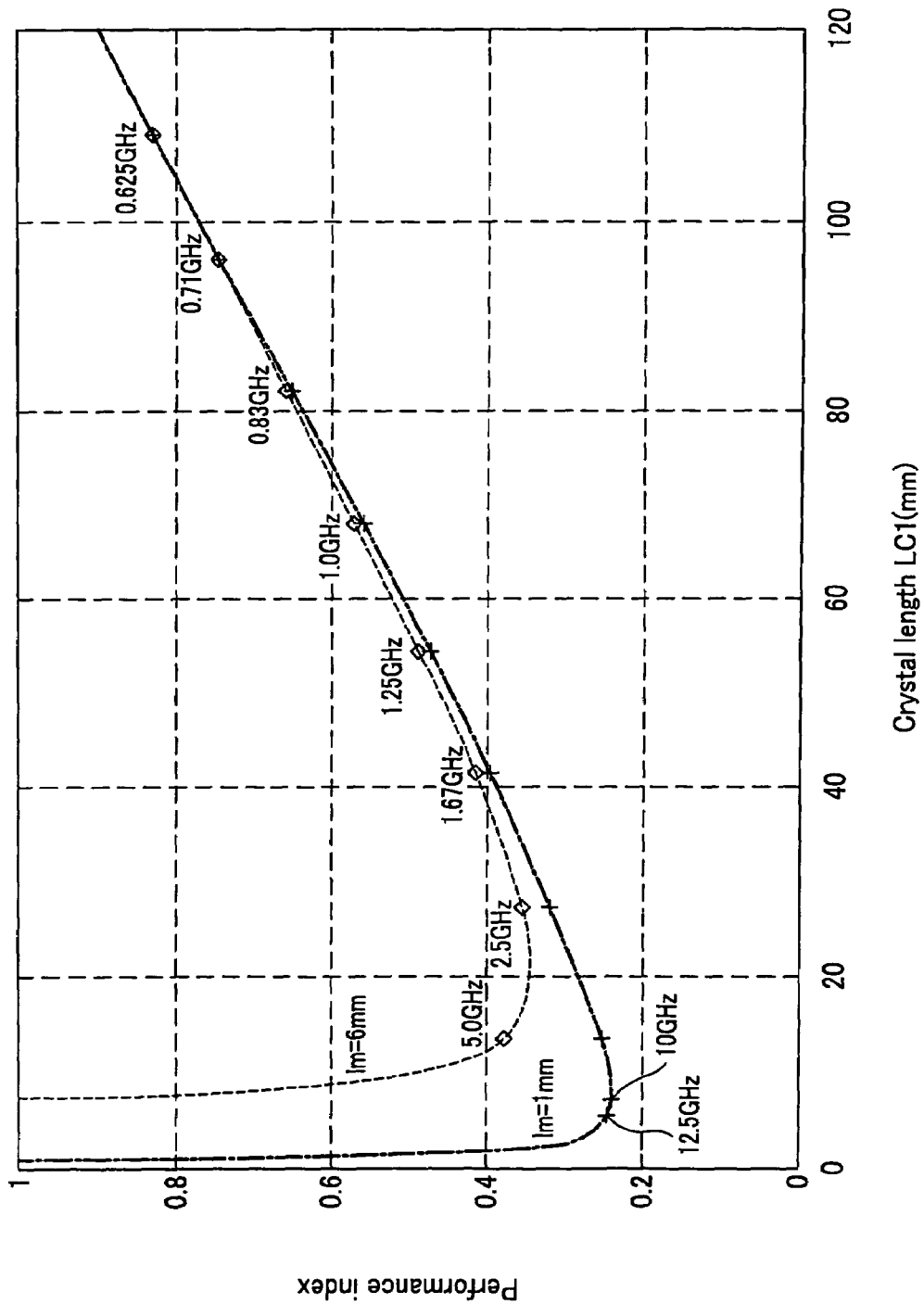
FIG. 18 is a graph illustrating the performance of another optical modulator according to the present invention when the length is limited.

FIG. 18 is a graph illustrating the relationship between the performance index computationally determined on the basis of the finesse and the loss factor Lo1 and the crystal length LC1. In FIG. 18, 1$m$ represents the difference between the crystal length LC1 and the length of the electrode 83. Generally, the waveguide 12 should be free from an electrode for several millimeters from the opposite ends thereof. Therefore, the graph of FIG. 18 shows instances where 6 mm and 1 mm are selected for computations.

As shown in FIG. 18, if 1$m$=6 mm, the performance index is small when the crystal length LC1 is 15 to 30 mm. When FSR that corresponds to the crystal length LC1 in such a range is plotted, it is found that the performance index is smallest at or near 2.5 GHz. For the simulation of the tendency shown in FIG. 18, it is assumed that the modulation frequency is 25 GHz, that the transmission loss of microwave at the electrode 83 is −10 dB/50 mm and that the transmission loss a of light is −0.0106/cm, considering that the modulation index is π radian when Pin=0.43 Wand the crystal length LC1=27 mm (when the electrode 83 is 21 mm long) at the time of forward modulation. Additionally, the reflection factor of the mirror is optimized relative to the loss factor that is a function of the crystal length.

Thus, when 1m=6 mm, it is possible to further improve the performance of the optical modulator 8 by making the crystal length LC1 of the waveguide 12 equal to about 27 mm. However, the crystal length LC1 has not necessarily to be made equal to about 27 mm and any other length may alternatively be selected within the range of 24±6 mm. For practical applications, it is preferable that the crystal length LC1 is one interger-th of 10 GHz for TDM (time division multiplex) optical communications or of 25 GHz for WDM (wavelength division multiplex) optical communications in the field of optical communications. The crystal length of 27 mm corresponds to 2.5 GHz.

A similar excellent performance is observed by simulation when the plot in the FSR that corresponds to the crystal length LC1 is 1.25 GHz. Therefore, a crystal length LC1 of about 54 mm may be selected correspondingly.

When 1$m$=1 mm, a similar excellent performance is observed by simulation at about 10 GHz. Thus, it is possible to further improve the performance of the optical modulator 8 by selecting a corresponding value for the crystal length LC1.

The invention claimed is:

1. An optical resonator comprising:
   resonance means formed by using an incidence side reflection film and an emission side reflection film arranged in parallel with each other and adapted to resonate light entering it by way of the incidence side reflection film;
   an optical waveguide formed so as to run through from the incidence side reflection film to the emission side reflection film and adapted to propagate light resonated by the resonance means;
   a substrate for forming the optical waveguide on the top surface thereof; and
   end facet protection means formed by respective members corresponding to the material of the substrate and provided at an upper part of the waveguide so as to make at least an end facet of each of the members share a plane with a first end facet or a second end facet, whichever appropriate, of the substrate including a light incidence end or a light emission end, whichever appropriate, of the optical waveguide and the shared planes substantially perpendicular relative to the optical waveguide,
   the incidence side reflection film and the emission side reflection film being laid respectively on the shared planes.

2. The optical resonator according to claim 1, wherein the end facet protection means is so arranged that the light incidence end or the light emission end of the optical waveguide is located substantially at the center of the corresponding formed plane.

3. The optical resonator according to claim 1, wherein the incidence side reflection film and the emission side reflection film are laid on over the entire formed planes.

4. The optical resonator according to claim 1, wherein the member forming the end facet protection means is made of a material same as that of the substrate and the end facet of the member and the end facet of the substrate that form the plane have a same crystal bearing.

5. The optical resonator according to claim 1, wherein the end facet protection means is arranged at an upper part of the waveguide so as to make one of the end facets of the member form an identical plane with the end facet of the substrate including the light incidence end of the optical waveguide and the other end facet of the member form an identical plane with the end facet of the substrate including the light emission end of the optical waveguide.

6. The optical resonator according to claim 1, wherein the crystal length of the optical waveguide is about 27 mm in the direction of propagation of light.

7. The optical resonator according to claim 1, wherein the optical waveguide has a crystal length that makes fFSR (Free Spectral Range) equal to about 2.5 Ghz.

8. An optical modulator comprising:
   oscillation means for oscillating a modulation signal of a predetermined frequency;
   resonance means formed by using an incidence side reflection film and an emission side reflection film arranged in parallel with each other and adapted to resonate light entering it by way of the incidence side reflection film;
   an optical waveguide formed so as to run through from the incidence side reflection film to the emission side reflection film and adapted to modulate the phase of light resonated by the resonance means according to the modulation signal supplied from the oscillation means;
   a substrate for forming the optical waveguide on the top surface thereof; and
   end facet protection means formed by respective members corresponding to the material of the substrate and provided at an upper part of the waveguide so as to make at least an end facet of each of the members share a plane with a first end facet or a second end facet, whichever appropriate, of the substrate including a light incidence end or a light emission end, whichever appropriate, of the optical waveguide and the shared planes substantially perpendicular relative to the optical waveguide, the incidence side reflection film and the emission side reflection film being laid respectively on the shared planes.

9. The optical modulator according to claim 8, wherein a gap L between the end facets of the substrate is expressed by $$L=c/2n_g f_{FSR} - c\tau_g/n_g,$$

(where c is the speed of light in vacuum, $n_g$ is the group refractive index of the optical waveguide, $f_{FSR}$ is the FSR (Free Spectral Range) of the modulation means and $\tau_g$ is the average value of the group delay time of the incidence side reflection film and the emission side reflection film).

10. An optical modulator comprising:
   detection means for detecting an electric signal;
   resonance means formed by using an incidence side reflection film and an emission side reflection film arranged in parallel with each other and adapted to resonate light entering it by way of the incidence side reflection film;
   an optical waveguide formed so as to run through from the incidence side reflection film to the emission side reflection film and adapted to modulate the phase of light resonated by the resonance means according to the wavelength of the electric signal detected by the detection means;
   a substrate for forming the optical waveguide on the top surface thereof; and
   end facet protection means formed by respective members corresponding to the material of the substrate and provided at an upper part of the waveguide so as to make at least an end facet of each of the members share a plane with a first end facet or a second end facet, whichever appropriate, of the substrate including a light incidence end or a light emission end, whichever appropriate, of the optical waveguide and the shared planes substantially perpendicular relative to the optical waveguide,
   the incidence side reflection film and the emission side reflection film being laid respectively on the shared planes.

11. An optical frequency comb generator comprising:
   oscillation means for oscillating a modulation signal of a predetermined frequency;
   resonance means formed by using an incidence side reflection film and an emission side reflection film arranged in parallel with each other and adapted to resonate light entering it by way of the incidence side reflection film;
   an optical waveguide formed so as to run through from the incidence side reflection film to the emission side reflection film and adapted to modulate the phase of light resonated by the resonance means according to the modulation signal supplied from the oscillation means and generate sidebands centered at the frequency of light and at intervals of the frequency of the modulation signal;
   a substrate for forming the optical waveguide on the top surface thereof; and
   end facet protection means formed by respective members corresponding to the material of the substrate and provided at an upper part of the waveguide so as to make at least an end facet of each of the members share a plane with a first end facet or a second end facet, whichever appropriate, of the substrate including a light incidence end or a light emission end, whichever appropriate, of the optical waveguide and the shared planes substantially perpendicular relative to the optical waveguide,
   the incidence side reflection film and the emission side reflection film being laid respectively on the shared planes.

12. The optical frequency comb generator according to claim 11, further comprising:
   a reflector for reflecting light transmitted to the outside by way of the incidence reflection film out of light resonated by the resonance means.

13. An optical oscillator comprising:
   resonance means formed by using an incidence side reflection film and an emission side reflection film arranged in parallel with each other and adapted to resonate light entering it by way of the incidence side reflection film or light generated by laser amplification;
   an optical waveguide formed so as to run through from the incidence side reflection film to the emission side reflection film and adapted to amplify light resonated by the resonance means and emit it to the outside by way of the emission side reflection film;
   a substrate for forming the optical waveguide on the top surface thereof; and
   end facet protection means formed by respective members corresponding to the material of the substrate and provided at an upper part of the waveguide so as to make at least an end facet of each of the members share a plane with a first end facet or a second end facet, whichever appropriate, of the substrate including a light incidence end or a light emission end, whichever appropriate, of the optical waveguide and the shared planes substantially perpendicular relative to the optical waveguide,
   the incidence side reflection film and the emission side reflection film being laid respectively on the shared planes.

14. The optical oscillator according to claim 13, wherein the optical waveguide is formed by diffusing a medium adapted to absorb light entering by way of the incidence side reflection film and having an amplification characteristic relative to the wavelength of light specific to the medium.

15. The optical oscillator according to claim 13, wherein the optical waveguide is formed by using a nonlinear optical crystal.

16. An optical oscillator comprising:
   oscillation means for oscillating a modulation signal of a predetermined frequency;
   resonance means formed by using an incidence side reflection film and an emission side reflection film arranged in parallel with each other and adapted to resonate light entering it by way of the incidence side reflection film or light generated by laser amplification;
   an optical waveguide formed so as to run through from the incidence side reflection film to the emission side reflection film and adapted to amplify light resonated by the resonance means according to the modulation signal supplied from the oscillation means and emit it to the outside by way of the emission side reflection film;
   a substrate for forming the optical waveguide on the top surface thereof; and
   end facet protection means formed by respective members corresponding to the material of the substrate and provided at an upper part of the waveguide so as to make at least an end facet of each of the members share a plane with a first end facet or a second end facet, whichever appropriate, of the substrate including a light incidence end or a light emission end, whichever appropriate, of the optical waveguide and the shared planes substantially perpendicular relative to the optical waveguide, the incidence side reflection film and the emission side reflection film being laid respectively on the shared planes; and the optical oscillator being adapted to lock the phases of a multiple of modes of laser oscillation.

17. The optical oscillator according to claim 16, wherein the optical waveguide locks the phases of a multiple of modes of laser oscillation on the basis of its own electrooptic effects and the oscillation means oscillates an optical pulse of a frequency equal to integer times of the FSR (Free Spectral Range) of the resonance means.

18. A method of preparing an optical resonator for resonating light by means of an optical waveguide formed so as to run through from an incidence side reflection film to an emission side reflection film arranged in parallel with each other, the light entering by way of the incidence side reflection film, the method comprising:

an optical waveguide forming step of forming the optical waveguide from the top surface of a substrate;

a layering step of laying a buffer layer on the substrate so as to cover the optical waveguide formed in the optical waveguide forming step;

an electrode forming step of forming an electrode for applying an electric filed to the optical waveguide on the buffer layer laid in the layering step;

a providing step of providing members corresponding to the material of the substrate in an upper part of the waveguide so as to make at least an end facet thereof share planes with the respective end facets of the substrate including respectively the light incidence end and the light emission end of the optical waveguide and make the planes substantially perpendicular relative to the optical waveguide; and a reflection film laying step of laying an incidence side reflection film or an emission side reflection film on the planes shared in the providing step.

* * * * *

UNITED STATES PATENT AND TRADEMARK OFFICE
CERTIFICATE OF CORRECTION

PATENT NO.       : 7,712,977 B2                                                           Page 1 of 1
APPLICATION NO.  : 11/578276
DATED            : May 11, 2010
INVENTOR(S)      : Motonobu Kourogi et al.

It is certified that error appears in the above-identified patent and that said Letters Patent is hereby corrected as shown below:

At column 8, line 66, please replace "fin" with -- fm -- so that the corresponding phrase reads -- of frequency fm --.

At column 9, line 42, please replace "fin" with -- fm -- so that the corresponding phrase reads -- of frequency fm --.

Signed and Sealed this

Sixth Day of July, 2010

David J. Kappos
*Director of the United States Patent and Trademark Office*